US010462786B2

(12) United States Patent
Zhang et al.

(10) Patent No.: US 10,462,786 B2
(45) Date of Patent: Oct. 29, 2019

(54) RESOURCE CONFIGURATION METHOD AND NETWORK DEVICE

(71) Applicant: Huawei Technologies Co., Ltd., Shenzhen, Guangdong (CN)

(72) Inventors: Jietao Zhang, Shenzhen (CN); Kewen Yang, Shenzhen (CN); Hongcheng Zhuang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/939,067

(22) Filed: Mar. 28, 2018

(65) Prior Publication Data

US 2018/0220421 A1 Aug. 2, 2018

Related U.S. Application Data

(63) Continuation of application No. PCT/CN2016/098471, filed on Sep. 8, 2016.

(30) Foreign Application Priority Data

Sep. 29, 2015 (CN) .......................... 2015 1 0633629

(51) Int. Cl.
*H04W 4/00* (2018.01)
*H04W 72/04* (2009.01)
(Continued)

(52) U.S. Cl.
CPC ....... *H04W 72/0446* (2013.01); *H04L 5/0053* (2013.01); *H04L 5/14* (2013.01);
(Continued)

(58) Field of Classification Search
None
See application file for complete search history.

(56) References Cited

U.S. PATENT DOCUMENTS

2013/0343336 A1   12/2013   Bai
2014/0233439 A1*  8/2014   Hong ................ H04W 72/1221
                                                    370/280
(Continued)

FOREIGN PATENT DOCUMENTS

CN   102196580 A   9/2011
CN   103298115 A   9/2013
(Continued)

*Primary Examiner* — Farah Faroul
(74) *Attorney, Agent, or Firm* — Leydig, Voit & Mayer, Ltd.

(57) ABSTRACT

Embodiments of the present disclosure provide a resource configuration method and a resource configuration network device. The method includes: obtaining subframe information of each of multiple cells, where the subframe information of each of the multiple cells includes subframe configuration information and flexible subframe resource requirement information of each cell; and determining a flexible subframe resource configuration of each cell according to the subframe information of each of the multiple cells, where the flexible subframe resource configuration of each cell includes that each cell uses one or more of N flexible subframes to perform data transmission. A flexible subframe resource requirement of each of multiple neighboring cells is obtained, and flexible subframe resource configurations of the cells are coordinated in a distributed manner according to a subframe configuration and the flexible subframe resource requirement of each cell, thus, cross-subframe interference that may exist between flexible subframes can be reduced.

20 Claims, 8 Drawing Sheets

(51) Int. Cl.
*H04L 5/00* (2006.01)
*H04L 5/14* (2006.01)
*H04W 72/08* (2009.01)
*H04W 72/10* (2009.01)
*H04W 16/10* (2009.01)

(52) U.S. Cl.
CPC ........... *H04L 5/1469* (2013.01); *H04W 16/10* (2013.01); *H04W 72/082* (2013.01); *H04W 72/10* (2013.01); *H04W 72/042* (2013.01)

(56) References Cited

U.S. PATENT DOCUMENTS

| | | | |
|---|---|---|---|
| 2014/0269456 A1* | 9/2014 | Wang | H04B 7/2656 370/280 |
| 2015/0092627 A1 | 4/2015 | Liu et al. | |
| 2015/0215078 A1* | 7/2015 | Chen | H04L 1/1812 370/277 |
| 2015/0358137 A1* | 12/2015 | Chae | H04L 1/1854 370/329 |
| 2015/0365941 A1* | 12/2015 | Liu | H04W 72/0446 370/280 |

FOREIGN PATENT DOCUMENTS

| | | |
|---|---|---|
| CN | 104640219 A | 5/2015 |
| WO | 2014110762 A1 | 7/2014 |
| WO | 2014110782 A1 | 7/2014 |
| WO | 2014186456 A1 | 11/2014 |

\* cited by examiner

200

Obtain subframe information of each of multiple cells, where the subframe information of each of the multiple cells includes subframe configuration information and flexible subframe resource requirement information of each cell, the subframe configuration information of each cell includes a configuration of each of N flexible subframes in each cell, the configuration of each flexible subframe includes that the flexible subframe is configured as an uplink subframe or a downlink subframe, the flexible subframe resource requirement information of each cell includes at least one of the following: a quantity of flexible subframes that are configured as uplink subframes and that are required by each cell, or a quantity of flexible subframes that are configured as downlink subframes and that are required by each cell, and N is a positive integer ⎯⎯ 210

Determine a flexible subframe resource configuration of each of the multiple cells according to the subframe information of each of the multiple cells, where the flexible subframe resource configuration of each cell includes that each cell uses one or more of the N flexible subframes to perform data transmission ⎯⎯ 220

FIG. 2

RESOURCE CONFIGURATION METHOD AND NETWORK DEVICE

CROSS-REFERENCE TO RELATED APPLICATIONS

This application is a continuation of International Application No. PCT/CN2016/098471, filed on Sep. 8, 2016, which claims priority to Chinese Patent Application No. 201510633629.4, filed on Sep. 29, 2015. The disclosures of the aforementioned applications are hereby incorporated by reference in their entireties.

TECHNICAL FIELD

Embodiments of the present application relate to the wireless communications field, and more specifically, to a resource configuration method and network device.

BACKGROUND

A high rate and diversity of communication services are two typical requirements on personal communication services in the future. Access network densification not only can shorten a wireless communication distance, but also can provide a basic guarantee for implementing a high-rate connection. Service diversity is characterized by that uplink and downlink service requirements of a terminal vary with an application. A time division duplex (TDD) mode helps a network provide diverse services. Therefore, dense deployment of sites in the TDD mode is a big trend of a future network architecture.

Network densification greatly shortens a coverage radius of each cell. In most cases, a quantity of terminals served by a cell is far less than that in a micro cell scenario. Diversity of terminal services results in a great fluctuation of a service of each cell. That is, uplink and downlink services of a cell change rapidly in a short time. Therefore, the 3rd Generation Partnership Project (3GPP) puts forward a research topic about enhanced interference management and traffic adaptation (eIMTA), to study a flexible TDD subframe configuration of a cell, that is, in dozens of milliseconds, each cell can flexibly select, according to a requirement of a service, a TDD subframe configuration that adapts to the service.

A biggest challenge brought by a flexible TDD subframe configuration of each cell to network interference management is cross-subframe interference between cells. That is, in a same subframe, due to different data transmission directions in neighboring cells, uplink (downlink) transmission of a cell interferes with downlink (uplink) transmission of a neighboring cell. In the prior art, resource configuration of each cell is performed only according to a service requirement of the cell without coordination with a neighboring cell. In addition, in many cases, when there is an idle resource in a current subframe configuration of a cell, because there is no use coordination between cells, the idle resource cannot be properly used to perform interference coordination. Consequently, not all network resources are properly allocated, and cross-subframe interference between cells is easily caused.

SUMMARY

Embodiments of the present disclosure provide a resource configuration method and network device in a time division duplex mode, so that cross-subframe interference between cells can be reduced.

According to a first aspect, a resource configuration method in a time division duplex mode is provided, including: obtaining, by a network device, subframe information of each of multiple cells, where the subframe information of each of the multiple cells includes subframe configuration information and flexible subframe resource requirement information of each cell, the subframe configuration information of each cell includes a configuration of each of N flexible subframes in each cell, the configuration of each flexible subframe includes that the flexible subframe is configured as an uplink subframe or a downlink subframe, the flexible subframe resource requirement information of each cell includes at least one of the following: a quantity of flexible subframes that are configured as uplink subframes and that are required by each cell, or a quantity of flexible subframes that are configured as downlink subframes and that are required by each cell, and N is a positive integer; and determining, by the network device, a flexible subframe resource configuration of each of the multiple cells according to the subframe information of each of the multiple cells, where the flexible subframe resource configuration of each cell includes that each cell uses one or more of the N flexible subframes to perform data transmission.

With reference to the first aspect, in a first possible implementation of the first aspect, the determining a flexible subframe resource configuration of each of the multiple cells according to the subframe information of each of the multiple cells includes: determining a first-type priority of each of the N flexible subframes according to the subframe information of each of the multiple cells, where a larger quantity of cells in which an $i^{th}$ flexible subframe is configured as a first-type flexible subframe in the multiple cells indicates a higher first-type priority of the $i^{th}$ flexible subframe, the first-type flexible subframe is a flexible subframe that is configured as an uplink subframe or a flexible subframe that is configured as a downlink subframe, $1 \leq i \leq N$, and i is an integer; determining a second-type priority of each of the N flexible subframes according to the subframe information of each of the multiple cells, where a larger quantity of cells in which a $j^{th}$ flexible subframe is configured as a second-type flexible subframe in the multiple cells indicates a higher second-type priority of the $j^{th}$ flexible subframe, the second-type flexible subframe and the first-type flexible subframe are configured differently, $1 \leq j \leq N$, and j is an integer; and determining, according to the first-type priority of each of the N flexible subframes and the second-type priority of each of the N flexible subframes, that each cell uses one or more of the N flexible subframes to perform data transmission.

With reference to the first possible implementation of the first aspect, in a second possible implementation of the first aspect, the subframe information of each cell includes an idle subframe indication, the idle subframe indication is used to indicate that a corresponding cell sets at least one of the first-type flexible subframe or the second-type flexible subframe of the N flexible subframes to an idle subframe, and the determining a flexible subframe resource configuration of a corresponding cell in the multiple cells according to the subframe information of each of the multiple cells includes: determining that the prioritization is not performed on the idle subframe.

With reference to the first or the second possible implementation of the first aspect, in a third possible implementation of the first aspect, the multiple cells include a first cell, a first-type flexible subframe resource requirement of the first cell is 0, and the determining a flexible subframe resource configuration of each of the multiple cells according to the subframe information of each of the multiple cells includes: determining that the prioritization is not performed on a first-type flexible subframe of the first cell.

With reference to the first to the third possible implementations of the first aspect, in a fourth possible implementation of the first aspect, the multiple cells include a second cell and a third cell, and the determining, according to the first-type priority of each of the N flexible subframes and the second-type priority of each of the N flexible subframes, that each cell uses one or more of the N flexible subframes to perform data transmission includes: determining, from the N flexible subframes, M first-type flexible subframes required by the second cell, where a flexible subframe resource requirement of the second cell includes that the second cell requires M first-type flexible subframes, and M is a positive integer; and determining, from N−M flexible subframes other than the M flexible subframes according to the M first-type flexible subframes required by the second cell, L second-type flexible subframes required by the third cell, where a flexible subframe resource requirement of the third cell includes that the third cell requires L second-type flexible subframes, and L is a positive integer.

With reference to the fourth possible implementation of the first aspect, in a fifth possible implementation of the first aspect, before the determining, from the N flexible subframes, M first-type flexible subframes required by the second cell, the method further includes: determining, according to the flexible subframe resource requirement information of each of the multiple cells, that the second cell is a cell that requires a largest quantity of first-type flexible subframes.

With reference to the fourth or the fifth possible implementation of the first aspect, in a sixth possible implementation of the first aspect, the determining, from the N flexible subframes, M first-type flexible subframes required by the second cell further includes: sequentially determining, from the N flexible subframes according to the first-type priority of each of the N flexible subframes, the M first-type flexible subframes as first-type flexible subframes of the second cell.

With reference to the fourth to the sixth possible implementations of the first aspect, in a seventh possible implementation of the first aspect, the determining, according to the first-type priority of each of the N flexible subframes and the second-type priority of each of the N flexible subframes, that each cell uses one or more of the N flexible subframes to perform data transmission includes: sequentially determining, from the N flexible subframes according to the second-type priority of each of the N flexible subframes and the flexible subframe resource requirement of the second cell, P second-type flexible subframes as second-type flexible subframes of the second cell, where the flexible subframe resource requirement information of the second cell includes that the second cell requires P second-type flexible subframes, and P is a positive integer.

With reference to the fourth to the seventh possible implementations of the first aspect, in an eighth possible implementation of the first aspect, the network device is a base station of the second cell, and the method further includes: sending a first-type flexible subframe resource configuration of the second cell to each cell of the at least one neighboring cell, where the first-type flexible subframe resource configuration of the second cell includes that the second cell uses the M first-type flexible subframes to perform data transmission.

With reference to the fourth to the eighth possible implementations of the first aspect, in a ninth possible implementation of the first aspect, before the determining, from N−M flexible subframes other than the M flexible subframes according to the M first-type flexible subframes required by the second cell, L second-type flexible subframes required by the third cell, the method further includes: determining, according to the flexible subframe resource requirement information of each of the multiple cells, that the third cell is not the cell that requires the largest quantity of first-type flexible subframes.

With reference to the fourth to the ninth possible implementations of the first aspect, in a tenth possible implementation of the first aspect, the determining, from N−M flexible subframes other than the M flexible subframes according to the M first-type flexible subframes required by the second cell, L second-type flexible subframes required by the third cell further includes: sequentially determining the L second-type flexible subframes of the third cell from the remaining N−M flexible subframes other than the M first-type flexible subframes according to the second-type priority of each of the N flexible subframes, the flexible subframe resource requirement of the third cell, and the M first-type flexible subframes required by the second cell.

With reference to the fourth to the tenth possible implementations of the first aspect, in an eleventh possible implementation of the first aspect, the determining, according to the first-type priority of each of the N flexible subframes and the second-type priority of each of the N flexible subframes, that each cell uses one or more of the N flexible subframes to perform data transmission includes: sequentially determining, from the N flexible subframes according to the first-type priority of each of the N flexible subframes and the flexible subframe resource requirement of the third cell, Q first-type flexible subframes as first-type flexible subframes of the third cell, where the flexible subframe resource requirement information of the third cell includes that the third cell requires Q first-type flexible subframes, and Q is a positive integer.

With reference to any one of the first to the seventh possible implementations of the first aspect, in a twelfth possible implementation of the first aspect, the network device is a centralized controller, and the method further includes: sending the flexible subframe resource configuration of each cell to each of the multiple cells, where the flexible subframe resource configuration of each cell includes a first-type flexible subframe used by each cell for data transmission and a second-type flexible subframe used by each cell for data transmission.

According to a second aspect, a resource configuration network device is provided, including: an obtaining unit, where the obtaining unit is configured to obtain subframe information of each of multiple cells, where the subframe information of each of the multiple cells includes subframe configuration information and flexible subframe resource requirement information of each cell, the subframe configuration information of each cell includes a configuration of each of N flexible subframes in each cell, the configuration of each flexible subframe includes that the flexible subframe is configured as an uplink subframe or a downlink subframe, the flexible subframe resource requirement information of each cell includes at least one of the following: a quantity of flexible subframes that are configured as uplink subframes and that are required by each cell, or a quantity of flexible subframes that are configured as downlink subframes and that are required by each cell, and N is a positive integer; and a processing unit, where the processing unit is configured to determine a flexible subframe resource configuration of each of the multiple cells according to the subframe information of each of the multiple cells, where the flexible subframe resource configuration of each cell includes that each cell uses one or more of the N flexible subframes to perform data transmission.

With reference to the second aspect, in a first possible implementation of the second aspect, the processing unit is specifically configured to: determine a first-type priority of each of the N flexible subframes according to the subframe information of each of the multiple cells, where a larger quantity of cells in which an $i^{th}$ flexible subframe is configured as a first-type flexible subframe in the multiple cells indicates a higher first-type priority of the $i^{th}$ flexible subframe, the first-type flexible subframe is a flexible subframe that is configured as an uplink subframe or a flexible subframe that is configured as a downlink subframe, $1 \leq i \leq N$, and i is an integer; determine a second-type priority of each of the N flexible subframes according to the subframe information of each of the multiple cells, where a larger quantity of cells in which a $j^{th}$ flexible subframe is configured as a second-type flexible subframe in the multiple cells indicates a higher second-type priority of the $j^{th}$ flexible subframe, the second-type flexible subframe and the first-type flexible subframe are configured differently, $1 \leq j \leq N$, and j is an integer; and determine, according to the first-type priority of each of the N flexible subframes and the second-type priority of each of the N flexible subframes, that each cell uses one or more of the N flexible subframes to perform data transmission.

With reference to the first possible implementation of the second aspect, in a second possible implementation of the second aspect, the subframe information of each cell includes an idle subframe indication, the idle subframe indication is used to indicate that a corresponding cell sets at least one of the first-type flexible subframe or the second-type flexible subframe of the N flexible subframes to an idle subframe, and the determining unit is further configured to: determine that the prioritization is not performed on the idle subframe.

With reference to the first or the second possible implementation of the second aspect, in a third possible implementation of the second aspect, the multiple cells include a first cell, a first-type flexible subframe resource requirement of the first cell is 0, and the determining unit is further configured to: determine that the prioritization is not performed on a first-type flexible subframe of the first cell.

With reference to the first to the third possible implementations of the second aspect, in a fourth possible implementation of the second aspect, the multiple cells include a second cell and a third cell, and the determining unit is further configured to: determine, from the N flexible subframes, M first-type flexible subframes required by the second cell, where a flexible subframe resource requirement of the second cell includes that the second cell requires M first-type flexible subframes, and M is a positive integer; and determine, from N−M flexible subframes other than the M flexible subframes according to the M first-type flexible subframes required by the second cell, L second-type flexible subframes required by the third cell, where a flexible subframe resource requirement of the third cell includes that the third cell requires L second-type flexible subframes, and L is a positive integer.

With reference to the fourth possible implementation of the second aspect, in a fifth possible implementation of the second aspect, the determining unit is further specifically configured to determine, according to the flexible subframe resource requirement information of each of the multiple cells, that the second cell is a cell that requires a largest quantity of first-type flexible subframes.

With reference to the fourth or the fifth possible implementation of the second aspect, in a sixth possible implementation of the second aspect, the determining unit is further specifically configured to sequentially determine, from the N flexible subframes according to the first-type priority of each of the N flexible subframes, the M first-type flexible subframes as first-type flexible subframes of the second cell.

With reference to the fourth to the sixth possible implementations of the second aspect, in a seventh possible implementation of the second aspect, the determining unit is further specifically configured to sequentially determine, from the N flexible subframes according to the second-type priority of each of the N flexible subframes and the flexible subframe resource requirement of the second cell, P second-type flexible subframes as second-type flexible subframes of the second cell, where the flexible subframe resource requirement information of the second cell includes that the second cell requires P second-type flexible subframes, and P is a positive integer.

With reference to the fourth to the seventh possible implementations of the second aspect, in an eighth possible implementation of the second aspect, the network device is a base station of the second cell, and the network device further includes: a first sending unit, where the first sending unit is configured to send a first-type flexible subframe resource configuration of the second cell to each cell of the at least one neighboring cell, where the first-type flexible subframe resource configuration of the second cell includes that the second cell uses the M first-type flexible subframes to perform data transmission.

With reference to the fourth to the eighth possible implementations of the second aspect, in a ninth possible implementation of the second aspect, the determining unit is further specifically configured to determine, according to the flexible subframe resource requirement information of each of the multiple cells, that the third cell is not the cell that requires the largest quantity of first-type flexible subframes.

With reference to the fourth to the ninth possible implementations of the second aspect, in a tenth possible implementation of the second aspect, the determining unit is further specifically configured to sequentially determine the L second-type flexible subframes of the third cell from the remaining N−M flexible subframes other than the M first-type flexible subframes according to the second-type priority of each of the N flexible subframes, the flexible subframe resource requirement of the third cell, and the M first-type flexible subframes required by the second cell.

With reference to the fourth to the tenth possible implementations of the second aspect, in an eleventh possible implementation of the second aspect, the determining unit is further specifically configured to sequentially determine from the N flexible subframes according to the first-type priority of each of the N flexible subframes and the flexible subframe resource requirement of the third cell, Q first-type flexible subframes as first-type flexible subframes of the third cell, where the flexible subframe resource requirement information of the third cell includes that the third cell requires Q first-type flexible subframes, and Q is a positive integer.

With reference to any one of the first to the seventh possible implementations of the second aspect, in a twelfth possible implementation of the second aspect, the network device is a centralized controller, and the network device further includes: a second sending unit, where the second sending unit is configured to send the flexible subframe resource configuration of each cell to each of the multiple cells, where the flexible subframe resource configuration of each cell includes a first-type flexible subframe used by each cell for data transmission and a second-type flexible subframe used by each cell for data transmission.

In the embodiments of the present disclosure, a flexible subframe resource requirement of each of multiple neighboring cells is obtained, and flexible subframe resource configurations of the cells are coordinated in a distributed manner according to a subframe configuration and the flexible subframe resource requirement of each cell, so that cross-subframe interference that may exist between flexible subframes can be reduced.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 2 is a schematic flowchart of a resource configuration method according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems such as a GSM, a Code Division Multiple Access (CDMA) system, a Wideband Code Division Multiple Access (WCDMA), a general packet radio service (GPRS), and Long Term Evolution (LTE).

A base station may be a base transceiver station (BTS, Base Transceiver Station) in GSM or CDMA, or may be a NodeB (NodeB) in WCDMA, or may be an evolved NodeB (eNB or e-NodeB, evolutional Node B) in LTE. This is not limited in the present disclosure. However, for ease of description, the following embodiments are described by using a NodeB as an example.

Figure 1A:
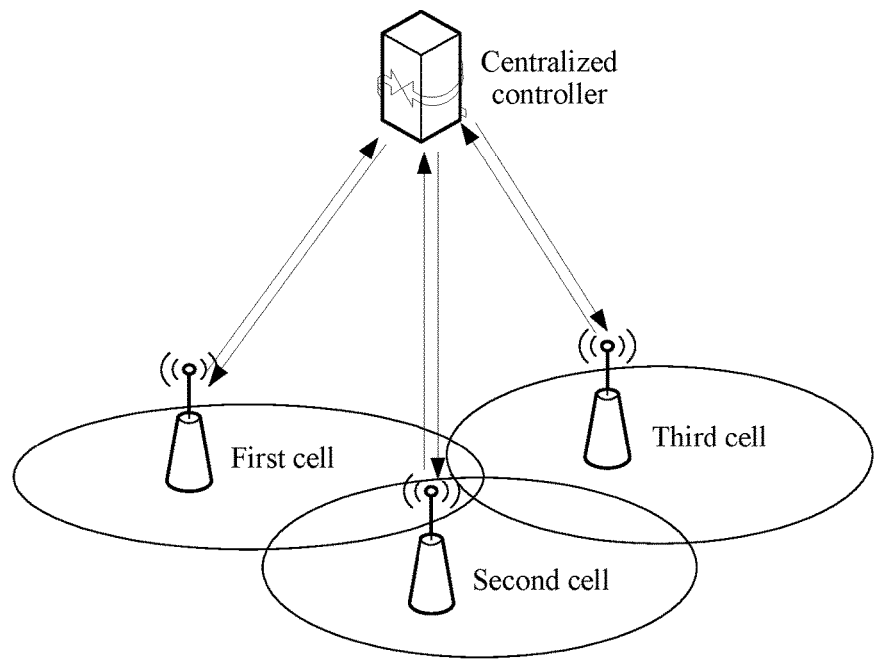
FIG. 1A is a schematic architecture diagram of an application scenario according to an embodiment of the present disclosure.
Figure 1B:
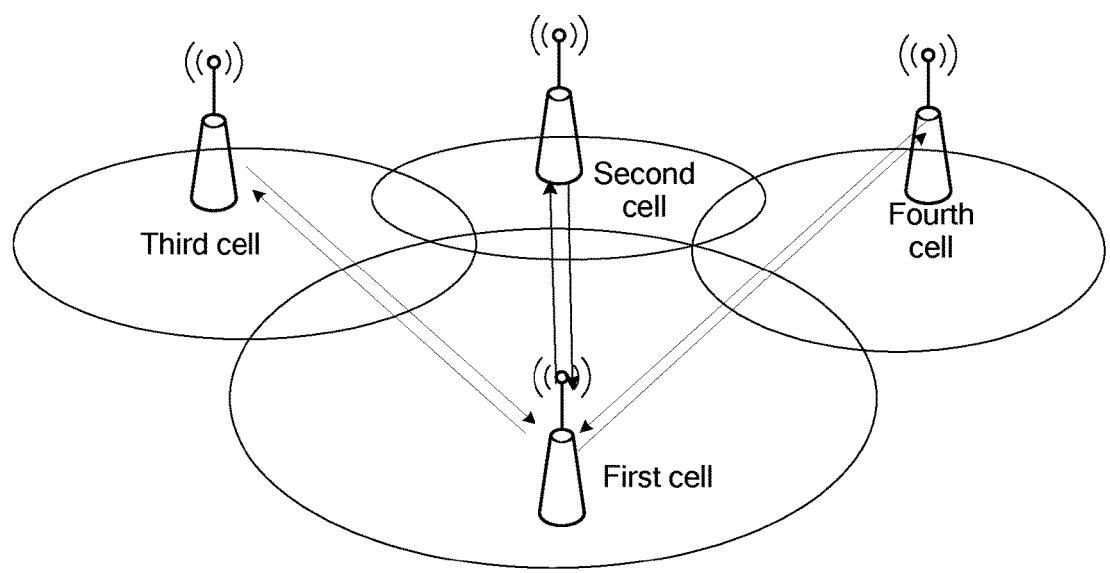
FIG. 1B is a schematic architecture diagram of an application scenario according to another embodiment of the present disclosure.

FIG. 1A and FIG. 1B are schematic architecture diagrams of application scenarios according to embodiments of the present disclosure. As shown in FIG. 1A, a system includes a centralized controller and a cell base station. The centralized controller may be a radio network controller (RNC). For ease of description, the following embodiments are described by using an RNC as an example. However, this is not limited in the present disclosure.

In FIG. 1A, the centralized controller may obtain subframe configuration information of a first cell, a second cell, and a third cell, perform a flexible subframe resource configuration for each cell according to subframe configuration information of each cell, and send this configuration to each neighboring cell. It should be understood that the schematic architecture diagram of this application scenario is described by using the three cells as an example, but the present disclosure is not limited to the foregoing quantity of cells.

As shown in FIG. 1B, a system includes four cells. A cell base station of each cell may obtain subframe configuration information of a neighboring cell of the cell, perform a flexible subframe resource configuration for each cell according to subframe configuration information of each cell, and send this configuration to each neighboring cell. It should be understood that the schematic architecture diagram of this application scenario is described by using the four cells as an example, but the present disclosure is not limited to the foregoing quantity of cells.

In this embodiment of the present disclosure, a flexible subframe resource requirement of each of multiple neighboring cells is obtained, and flexible subframe resource configurations of the cells are coordinated in a distributed manner according to a subframe configuration and the flexible subframe resource requirement of each cell, so that cross-subframe interference that may exist between flexible subframes can be reduced.

FIG. 2 is a schematic flowchart of a resource configuration method according to an embodiment of the present disclosure.

As shown in FIG. 2, the method 200 includes:

210. A network device obtains subframe information of each of multiple cells, where the subframe information of each of the multiple cells includes subframe configuration information and flexible subframe resource requirement information of each cell, the subframe configuration information of each cell includes a configuration of each of N flexible subframes in each cell, the configuration of each flexible subframe includes that the flexible subframe is configured as an uplink subframe or a downlink subframe, the flexible subframe resource requirement information of each cell includes at least one of the following: a quantity of flexible subframes that are configured as uplink subframes and that are required by each cell, or a quantity of flexible subframes that are configured as downlink subframes and that are required by each cell, and N is a positive integer.

220. The network device determines a flexible subframe resource configuration of each of the multiple cells according to the subframe information of each of the multiple cells, where the flexible subframe resource configuration of each cell includes that each cell uses one or more of the N flexible subframes to perform data transmission.

It should be understood that the network device may be a central controller that manages the multiple cells, to configure flexible subframe resources for all the multiple cells, for example, may be a base station unit or a control unit that coordinates and controls the multiple cells; or the network device may be a cell base station, and this is not limited in the present disclosure.

In step 210, a subframe configuration of each of the multiple cells includes a fixed subframe configuration and a flexible subframe configuration of the cell. Fixed subframes are fixedly configured as uplink or downlink subframes in different cells, and the fixed subframes have same configurations in different cells. Flexible subframes may be configured as uplink or downlink subframes flexibly in different cells. Therefore, the subframe configuration information of each cell includes configuration information of each flexible subframe of the corresponding cell. The subframe configuration information is used to indicate that each flexible subframe is configured as an uplink subframe or a downlink subframe in a corresponding cell.

In step 210, the flexible subframe resource requirement of each cell includes at least one of the following: a quantity of flexible subframes that need to be configured as uplink subframes, or a quantity of flexible subframes that need to be configured as downlink subframes. That is, a quantity of flexible subframes that need to be configured as uplink subframes in a cell represents a requirement of the cell for an uplink transmission resource or an amount of data to be transmitted in uplink data transmission; a quantity of flexible subframes that need to be configured as downlink subframes in a cell represents a requirement of the cell for a downlink transmission resource or an amount of data to be transmitted in downlink data transmission. Specifically, a requirement of an uplink service for an uplink flexible subframe resource is flexible subframe resources that need to be configured as uplink subframes and that remain from all resources required for uplink transmission of a cell, excluding a resource that can be provided by an uplink fixed subframe of the cell; a requirement of a downlink service for a downlink flexible subframe resource is flexible subframe resources that need to be configured as downlink subframes and that remain from all resources required for downlink transmission of a cell, excluding a resource that can be provided by a downlink fixed subframe of the cell.

The determining one or more flexible subframe resource configuration of each cell according to the subframe information of each of the multiple cells in step 220 is specifically: obtaining the subframe configuration of each of the multiple cells and the flexible subframe resource requirement of each of the multiple cells, and determining one or more flexible subframe that is required for data transmission and that is selected by each cell from N flexible subframes that are configured for the cell.

In this embodiment of the present disclosure, the flexible subframe resource requirement of each of the multiple neighboring cells is obtained, and the flexible subframe resource configurations of the cells are coordinated in a distributed manner according to the subframe configuration and the flexible subframe resource requirement of each cell, so that cross-subframe interference that may exist between flexible subframes can be reduced.

Optionally, in an embodiment of the present disclosure, determining a flexible subframe resource configuration of a first cell according to the subframe information of each of the multiple cells includes: determining a first-type priority of each of the N flexible subframes according to the subframe information of each of the multiple cells, where a larger quantity of cells in which an $i^{th}$ flexible subframe is configured as a first-type flexible subframe in the multiple cells indicates a higher first-type priority of the $i^{th}$ flexible subframe, the first-type flexible subframe is a flexible subframe that is configured as an uplink subframe or a flexible subframe that is configured as a downlink subframe, $1 \leq i \leq N$, and i is a positive integer; determining a second-type priority of each of the N flexible subframes according to the subframe information of each of the multiple cells, where a larger quantity of cells in which a $j^{th}$ flexible subframe is configured as a second-type flexible subframe in the multiple cells indicates a higher second-type priority of the $j^{th}$ flexible subframe, the second-type flexible subframe and the first-type flexible subframe are configured differently, $1 \leq j \leq N$, and j is a positive integer; and determining, according to the first-type priority of each of the N flexible subframes and the second-type priority of each of the N flexible subframes, that the first cell uses one or more of the N flexible subframes to perform data transmission.

Specifically, when the first-type flexible subframe is a flexible subframe that is configured as an uplink subframe, the first-type priority is a priority of the flexible subframe that is configured as an uplink subframe. If the second-type flexible subframe is a flexible subframe that is configured as a downlink subframe, the second-type priority is a priority of the flexible subframe that is configured as a downlink subframe. Whether the first-type priority is a priority of an uplink flexible subframe or a priority of a downlink flexible subframe may be preset by a network management system according to an operator policy, a network status, or the like.

Further, subframe information of the first cell and at least one neighboring cell carries subframe configurations of the cells that are respectively corresponding to the subframe information of the first cell and the at least one neighboring cell, and the subframe configuration of each cell includes N flexible subframe configurations. Therefore, uplink prioritization is performed according to each quantity of cells in which a flexible subframe is configured as an uplink subframe in the multiple cells, and a flexible subframe that can be configured as a resource for an uplink transmission direction for a largest quantity of cells has a highest priority. In addition, downlink prioritization is performed on the N flexible subframes according to quantities of cells in which the N flexible subframes can be configured as resources for a downlink transmission direction. Specifically, for example, there are five cells B1, B2, B3, B4, and B5, and each cell includes a first flexible subframe, a second flexible subframe, a third flexible subframe, a fourth flexible subframe, and a fifth flexible subframe. In the cell B1, resource transmission directions respectively configured for the first flexible subframe, the second flexible subframe, the third flexible subframe, the fourth flexible subframe, and the fifth flexible subframe are uplink, uplink, uplink, uplink, and uplink. In the cell B2, resource transmission directions respectively configured for the first flexible subframe, the second flexible subframe, the third flexible subframe, the fourth flexible subframe, and the fifth flexible subframe are downlink, downlink, uplink, downlink, and downlink. In the cell B3, resource transmission directions respectively configured for the first flexible subframe, the second flexible subframe, the third flexible subframe, the fourth flexible subframe, and the fifth flexible subframe are uplink, uplink, downlink, downlink, and downlink. In the cell B4, resource transmission directions respectively configured for the first flexible subframe, the second flexible subframe, the third flexible subframe, the fourth flexible subframe, and the fifth flexible subframe are uplink, uplink, uplink, uplink, and downlink. In the cell B5, resource transmission directions respectively configured for the first flexible subframe, the second flexible subframe, the third flexible subframe, the fourth flexible subframe, and the fifth flexible subframe are uplink, downlink, uplink, uplink, and downlink. Then, for downlink transmission, the downlink resource transmission direction can be configured for the fifth flexible subframe in four cells B2, B3, B4, and B5, the downlink resource transmission direction can be configured for the second flexible subframe in two cells B2 and B5, the downlink resource transmission direction can be configured for the fourth flexible subframe in two cells B2 and B3, the downlink resource transmission direction can be configured for the first flexible subframe only in the cell B2, and the downlink resource transmission direction can be configured for the third flexible subframe only in the cell B3. Therefore, a downlink transmission priority ranking of the fifth flexible subframe is the highest, followed by the second flexible subframe and the fourth flexible subframe, and rankings of the first flexible subframe and the third flexible subframe are the lowest. According to the foregoing priority rankings, when a downlink flexible subframe needs to be used for downlink transmission in any one of the cells B1, B2, B4, and B5, the cell first selects the fifth flexible subframe according to a transmission requirement to allocate a transmission resource, then selects a subframe from the second flexible subframe and the fourth flexible subframe to configure a downlink transmission resource for the cell, and finally selects a subframe from the first flexible subframe and the third flexible subframe to configure a downlink transmission resource for the cell. For example, when the cell requires three downlink flexible subframe resources, the cell selects the fifth flexible subframe, the second flexible subframe, and the fourth flexible subframe to perform downlink resource transmission. For uplink transmission, an uplink transmission resource configuration method is similar to the downlink transmission resource configuration method, and is not described herein.

Optionally, in an embodiment of the present disclosure, the subframe information of each cell includes a flexible subframe idle indication. The flexible subframe idle indication is used to indicate that each cell sets, to an idle subframe, at least one of a flexible subframe configured as a first-type flexible subframe or a flexible subframe configured as a second-type flexible subframe in the N flexible subframes. The determining, according to the subframe information of each of the multiple cells, that the first cell uses one or more of the N flexible subframes to perform data transmission includes: prioritization is not performed on the idle subframe.

For example, if a cell determines, according to a current service, that no uplink flexible subframe resource of the cell needs to be used, an uplink flexible subframe idle indication of the cell is 1; or if a cell determines, according to a current service, that an uplink flexible subframe resource of the cell needs to be used, an uplink flexible subframe idle indication of the cell is 0. Likewise, if a cell determines, according to a current service, that no downlink flexible subframe resource of the cell needs to be used, a downlink flexible subframe idle indication of the cell is 1; or if a cell determines, according to a current service, that a downlink flexible subframe resource of the cell needs to be used, a downlink flexible subframe idle indication of the cell is 0.

That is, for a cell in which no uplink flexible subframe needs to be used, a fixed subframe of the cell can provide a resource required by the cell for uplink data transmission; for a cell in which no downlink flexible subframe needs to be used, a fixed subframe of the cell can provide a resource required by the cell for downlink data transmission. It should be understood that when the subframe information does not include an idle subframe indication, it may be concluded, according to the flexible subframe resource requirement of each cell in the subframe information, whether the cell requires an uplink or downlink flexible subframe. That is, if an uplink flexible subframe requirement of the cell is zero, it is equivalent to that an uplink flexible subframe idle indication of the cell is 1; or if an uplink flexible subframe requirement of the cell is not zero, it is equivalent to that an uplink flexible subframe idle indication of the cell is 0. Likewise, if a downlink flexible subframe requirement of the cell is zero, it is equivalent to that a downlink flexible subframe idle indication of the cell is 1; or if a downlink flexible subframe requirement of the cell is not zero, it is equivalent to that a downlink flexible subframe idle indication of the cell is 0.

Specifically, if first information includes the flexible subframe idle indication, when it is determined, according to the idle indication, that a flexible subframe of a cell does not need to be configured as a data transmission resource, the subframe that does not need to be configured as a data transmission resource is referred to as an idle subframe, and the idle subframe of the cell is not considered when uplink or downlink prioritization is performed. For example, there are five cells B1, B2, B3, B4, and B5, and each cell includes a first flexible subframe, a second flexible subframe, a third flexible subframe, a fourth flexible subframe, and a fifth flexible subframe. In the cell B1, resource transmission directions respectively configured for the first flexible subframe, the second flexible subframe, the third flexible subframe, the fourth flexible subframe, and the fifth flexible subframe are uplink, uplink, uplink, uplink, and uplink. In the cell B2, resource transmission directions respectively configured for the first flexible subframe, the second flexible subframe, the third flexible subframe, the fourth flexible subframe, and the fifth flexible subframe are downlink, downlink, uplink, downlink, and downlink. In the cell B3, resource transmission directions respectively configured for the first flexible subframe, the second flexible subframe, the third flexible subframe, the fourth flexible subframe, and the fifth flexible subframe are uplink, uplink, downlink, downlink, and downlink. For example, a downlink flexible subframe idle indication of the cell B3 is 1, that is, the third, the fourth, and the fifth flexible subframes are set to idle subframes. In the cell B4, resource transmission directions respectively configured for the first flexible subframe, the second flexible subframe, the third flexible subframe, the fourth flexible subframe, and the fifth flexible subframe are uplink, uplink, uplink, uplink, and downlink. In the cell B5, resource transmission directions respectively configured for the first flexible subframe, the second flexible subframe, the third flexible subframe, the fourth flexible subframe, and the fifth flexible subframe are uplink, downlink, uplink, uplink, and downlink. For example, an uplink flexible subframe idle indication of the cell B4 is 1, that is, the first, the third, and the fourth flexible subframes are set to idle subframes. Then, for downlink transmission, the downlink resource transmission direction can be configured for the fifth flexible subframe in three cells B2, B4, and B5, the downlink resource transmission direction can be configured for the second flexible subframe in two cells B2 and B5, the downlink resource transmission direction can be configured for both the first and the fourth flexible subframes in only one cell B2. Therefore, a priority ranking of the fifth flexible subframe is the highest, followed by the second flexible subframe, and rankings of the first and the fourth flexible subframes are the lowest. According to the foregoing priority rankings, the fifth flexible subframe and the second flexible subframe are sequentially allocated as transmission resources, and a sequence of configuring the first flexible subframe and the fourth flexible subframe as downlink transmission resources may be flexibly determined according to another factor. For uplink transmission, an uplink transmission resource configuration method is similar to the downlink transmission resource configuration method, and is not described herein.

Optionally, in an embodiment of the present disclosure, the multiple cells include a first cell, a first-type flexible subframe resource requirement of the first cell is 0, and the determining a flexible subframe resource configuration of each of the multiple cells according to the subframe information of each of the multiple cells includes: determining that prioritization is not performed on a first-type flexible subframe of the first cell.

Specifically, if an uplink flexible subframe resource requirement of a cell is 0, that is, an uplink flexible subframe of the cell is an idle subframe, prioritization is not performed on the uplink flexible subframe of the cell; or if a downlink flexible subframe resource requirement of a cell is 0, that is, a downlink flexible subframe of the cell is an idle subframe, prioritization is not performed on the downlink flexible subframe of the cell.

When a cell determines that an uplink flexible subframe configured for the cell is an idle subframe, it means that the cell does not require the uplink flexible subframe for uplink resource transmission, that is, the cell does not use the uplink flexible subframe of the local cell for resource transmission. When a cell determines that a downlink flexible subframe configured for the cell is an idle subframe, it means that the cell does not require the downlink flexible subframe for downlink resource transmission, that is, the cell does not use the downlink flexible subframe of the local cell for resource transmission. Therefore, when uplink or downlink prioritization is performed on flexible subframes, the prioritization is not performed on an idle subframe. This avoids an inaccurate prioritization result caused by that no resource can be allocated after prioritization is performed on an idle subframe.

Optionally, in an embodiment of the present disclosure, the multiple cells include a second cell and a third cell, and the determining, according to the first-type priority of each of the N flexible subframes and the second-type priority of each of the N flexible subframes, that each cell uses one or more of the N flexible subframes to perform data transmission includes: determining, from the N flexible subframes, M first-type flexible subframes required by the second cell, where a flexible subframe resource requirement of the second cell includes that the second cell requires M second-type flexible subframes, and M is a positive integer; and determining, from N−M flexible subframes other than the M flexible subframes according to the M first-type flexible subframes required by the second cell, L second-type flexible subframes required by the third cell, where a flexible subframe resource requirement of the third cell includes that the third cell requires L second-type flexible subframes, and L is a positive integer.

Specifically, for example, the second cell requires M flexible subframes that are configured as uplink subframes. After the second cell selects, from all the N flexible subframes, the M flexible subframes that are configured as uplink subframes, when the third cell configures a downlink flexible subframe, the third cell cannot select the M flexible subframes that are already configured as uplink subframes, and selects, from the remaining N−M flexible subframes, a flexible subframe that is configured as a downlink subframe and that is required by the third cell.

It should be understood that when a quantity of the N−M flexible subframes is greater than or equal to the quantity L of the flexible subframes required by the third cell, L flexible subframes required by the third cell can be configured for the third cell by using the foregoing method. However, when the quantity of the N−M flexible subframes is less than the quantity L of the flexible subframes required by the third cell, a flexible subframe of the third cell is preferentially selected from the N−M flexible subframes, and remaining L−(N−M) flexible subframes may be selected from remaining available flexible subframes according to the prior art.

Therefore, this can avoid cross-subframe interference resulted from different actual transmission directions of a same subframe in different cells caused by that cells independently use different flexible subframe resource configurations without coordination between the cells in the prior art.

Optionally, in an embodiment of the present disclosure, before the determining, from the N flexible subframes, M first-type flexible subframes required by the second cell, the method further includes: determining, according to the flexible subframe resource requirement information of each of the multiple cells, that the second cell is a cell that requires a largest quantity of first-type flexible subframes.

Specifically, whether the first-type flexible subframe is a flexible subframe that is configured as an uplink subframe or a flexible subframe that is configured as a downlink subframe needs to be determined according to an operator policy or a network status. The subframe information of each cell includes the flexible subframe resource requirement information of the cell, that is, a quantity of uplink flexible subframes or a quantity of downlink flexible subframes required by each cell, or a quantity of resources required by each cell for uplink transmission or downlink data transmission. Therefore, quantities of uplink flexible subframes of all cells or quantities of resources required by all the cells for uplink transmission may be compared, so as to determine a cell as a cell that requires a largest quantity of uplink flexible subframes; and quantities of downlink flexible subframes of all cells or quantities of resources required by all the cells for downlink transmission may be compared, so as to determine a cell as a cell that requires a largest quantity of downlink flexible subframes.

Optionally, in an embodiment of the present disclosure, the determining, from the N flexible subframes, M first-type flexible subframes required by the second cell further includes: sequentially determining, from the N flexible subframes according to the first-type priority of each of the N flexible subframes, the M first-type flexible subframes as first-type flexible subframes of the second cell.

Specifically, when as much cross-subframe interference of uplink transmission to downlink transmission between cells as possible needs to be preferentially avoided as required by an operator policy or a network status, the first-type flexible subframe is a flexible subframe that is configured as a downlink subframe, that is, the first-type priority is a priority of the flexible subframe that is configured as a downlink flexible subframe. If a quantity of flexible subframes that are configured as downlink subframes and that are required by the first cell is M, the M flexible subframes that are configured as downlink subframes and that are required by the first cell are determined from the N flexible subframes according to a requirement of the first cell for the quantity of the flexible subframes that are configured as downlink subframes and the priority of the flexible subframe that is configured as a downlink flexible subframe, and the M flexible subframes that are configured as downlink subframes are selected and used for downlink data transmission.

Alternatively, specifically, when as much cross-subframe interference of downlink transmission to uplink transmission between cells as possible needs to be preferentially avoided as required by an operator policy or a network status, the first-type flexible subframe is a flexible subframe that is configured as an uplink subframe, that is, the first-type priority is a priority of the flexible subframe that is configured as an uplink flexible subframe. Specifically, it needs to be determined whether the first cell is a cell that requires a largest quantity of flexible subframes that are configured as uplink subframes. If the first cell is a cell that requires the largest quantity of flexible subframes that are configured as uplink subframes, and a quantity of flexible subframes that are configured as uplink subframes and that are required by the first cell is M, the M flexible subframes that are configured as uplink subframes and that are required by the first cell are determined from the N flexible subframes according to a requirement of the first cell for the quantity of the flexible subframes that are configured as uplink subframes and the priority of the flexible subframe that is configured as an uplink flexible subframe, and the M flexible subframes that are configured as uplink subframes are selected and used for uplink data transmission.

It should be understood that it may be determined, according to an operator policy or a network status, that a downlink flexible subframe configuration or an uplink flexible configuration is preferentially determined. For example, if as much cross-subframe interference of uplink transmission to downlink transmission between cells as possible is preferentially avoided as required by an operator policy, a downlink flexible subframe resource is first configured; otherwise, if as much cross-subframe interference of downlink transmission to uplink transmission between cells as possible is preferentially avoided as required by an operator policy, an uplink flexible subframe resource is first configured. Still alternatively, in a current network, a network status is obtained by collecting statistics about an interference status of transmission of users in each cell. In the network, if interference generated when a user receives downlink transmission is severer than that generated when each cell receives uplink transmission from a user, a downlink flexible subframe resource is first configured. Otherwise, if interference generated when each cell receives uplink transmission from a user is severer than that generated when a user receives downlink transmission, an uplink flexible subframe resource is first configured. This is not limited in the present disclosure.

Optionally, in an embodiment of the present disclosure, the determining, according to the first-type priority of each of the N flexible subframes and the second-type priority of each of the N flexible subframes, that each cell uses one or more of the N flexible subframes to perform data transmission includes: sequentially determining, from the N flexible subframes according to the second-type priority of each of the N flexible subframes and the flexible subframe resource requirement of the second cell, P second-type flexible subframes as second-type flexible subframes of the second cell, where the flexible subframe resource requirement information of the second cell includes that the second cell requires P second-type flexible subframes, and P is a positive integer.

Specifically, when as much cross-subframe interference of uplink transmission to downlink transmission between cells as possible needs to be preferentially avoided as required by an operator policy or a network status, the first-type flexible subframe is a flexible subframe that is configured as a downlink subframe, that is, the first-type priority is a priority of the flexible subframe that is configured as a downlink flexible subframe. In this case, the second-type flexible subframe is a flexible subframe that is configured as an uplink subframe, and the second-type priority is a priority of the flexible subframe that is configured as an uplink flexible subframe. If a quantity of flexible subframes that are configured as downlink subframes and that are required by the first cell is M, after M flexible subframes that are configured as downlink subframes and that are required by the second cell are determined by the second cell from the N flexible subframes, P flexible subframes need to be selected as an uplink flexible subframe resource configuration of the second cell, from flexible subframes that are configured as uplink subframes in N flexible subframes, according to an uplink priority of each flexible subframe and the quantity P of flexible subframes that are configured as uplink subframes and that are required by the second cell.

Alternatively, when as much cross-subframe interference of downlink transmission to uplink transmission between cells as possible needs to be preferentially avoided as required by according to an operator policy or a network status, the first-type flexible subframe is a flexible subframe that is configured as an uplink subframe, that is, the first-type priority is a priority of the flexible subframe that is configured as an uplink flexible subframe. A specific method is similar to the foregoing method, and is not described herein.

In other words, when the second cell requires the largest quantity of first-type flexible subframes, a first-type flexible subframe configuration of the second cell needs to be determined only according to a first-type flexible subframe resource requirement of the second cell and a first-type priority of each flexible subframe; and a second-type flexible subframe configuration of the second cell needs to be determined only according to a second-type flexible subframe resource requirement of the second cell and a second-type priority of each flexible subframe.

Optionally, in an embodiment of the present disclosure, the network device is a base station of the second cell, and the method further includes: sending a first-type flexible subframe resource configuration of the second cell to each of at least one neighboring cell, where the first-type flexible subframe resource configuration of the second cell includes that the second cell uses M first-type flexible subframes to perform data transmission.

Specifically, because the second cell requires the largest quantity of first-type flexible subframes, the second cell needs to send, to each neighboring cell, the first-type flexible subframe resource configuration of the second cell, or send information about a subframe in which a flexible subframe resource configuration of the second cell may conflict with another cell. For example, when it is determined, according to a network policy, that the first-type flexible subframe is a flexible subframe that is configured as an uplink subframe, the second cell requires the largest quantity of flexible subframes that are configured as uplink subframes, and three flexible subframes 1, 3, and 4 are configured for uplink data transmission in the second cell. In addition, downlink data can be transmitted in three flexible subframes 2, 3, and 5 in the third cell. The second cell may notify the third cell that the three flexible subframes 1, 3, and 4 are already occupied by the second cell for uplink data transmission, or may notify the third cell only that because the flexible subframe 3 in which uplink and downlink interference between the second cell and the third cell may occur is already occupied by the second cell, the third cell cannot perform data transmission in the flexible subframe 3, so as to avoid relatively high interference generated when the third cell uses the flexible subframe 3 for downlink data transmission and the second cell uses the flexible subframe 3 for uplink data transmission. Therefore, it may be understood that a flexible subframe configuration of the second cell may be information about a flexible subframe in which a conflict occurs between the second cell and another cell, and this is not limited in the present disclosure.

Optionally, in an embodiment of the present disclosure, before the determining, from N−M flexible subframes other than the M flexible subframes according to the M first-type flexible subframes required by the second cell, L second-type flexible subframes required by the third cell, the method further includes: determining, according to the flexible subframe resource requirement information of each of the multiple cells, that the third cell is not the cell that requires the largest quantity of first-type flexible subframes.

Optionally, in an embodiment of the present disclosure, the determining, from N−M flexible subframes other than the M flexible subframes according to the M first-type flexible subframes required by the second cell, L second-type flexible subframes required by the third cell further includes: sequentially and preferentially determining the L second-type flexible subframes of the third cell from the remaining N−M flexible subframes other than the M first-type flexible subframes according to the second-type priority of each of the N flexible subframes, the flexible subframe resource requirement of the third cell, and the M first-type flexible subframes required by the second cell.

Specifically, when the first-type flexible subframe is a flexible subframe that is configured as an uplink subframe, the first-type priority is a priority of the flexible subframe that is configured as an uplink flexible subframe. Alternatively, when as much cross-subframe interference of downlink transmission to uplink transmission between cells as possible needs to be preferentially avoided as required by an operator policy or a network status, a configuration needs to be preferentially performed for a cell that requires a largest quantity of flexible subframes configured as uplink flexible subframes. It is determined, according to the subframe information of each of the multiple cells, that the third cell is not the cell that requires the largest quantity of flexible subframes configured as uplink subframes. Because a configuration is preferentially performed for the second cell that requires the largest quantity of flexible subframes configured as uplink subframes, a downlink flexible subframe configuration of the third cell needs to be performed according to a configuration status of the second cell. If flexible subframes that are configured as uplink subframes in the second cell are the selected M first-type flexible subframes, the selected M flexible subframes that are configured as uplink subframes of the second cell cannot be selected as downlink flexible subframes of the third cell, and L flexible subframes that are configured as downlink subframes are selected from the remaining N−M flexible subframes. The L flexible subframes that are configured as downlink subframes are preferentially used for data transmission.

Still alternatively, specifically, when the first-type flexible subframe is a flexible subframe that is configured as a downlink subframe, the first-type priority is a priority of the flexible subframe that is configured as a downlink flexible subframe. Alternatively, when as much cross-subframe interference of uplink transmission to downlink transmission between cells as possible needs to be preferentially avoided as required by an operator policy or a network status, a configuration is preferentially performed for a cell that requires the largest quantity of flexible subframes configured as downlink flexible subframes. It is determined, according to the subframe information of each of the multiple cells, that the third cell is not the cell that requires the largest quantity of flexible subframes configured as downlink subframes. Because a configuration is preferentially performed for the second cell that requires the largest quantity of flexible subframes configured as downlink subframes, a flexible subframe configuration of the third cell needs to be performed according to a configuration status of the second cell. If flexible subframes that are configured as downlink subframes in the second cell are the selected M flexible subframes, the selected M flexible subframes that are configured as downlink subframes of the second cell cannot be selected as flexible subframes of the third cell, and L flexible subframes that are configured as uplink subframes are selected from the remaining N−M flexible subframes. The L flexible subframes that are configured as uplink subframes are preferentially used for data transmission.

It should be understood that when the network device is a cell base station and a second-type flexible subframe resource configuration of the third cell needs to be determined, a first-type flexible subframe resource configuration sent by the second cell needs to be received, so as to determine the second-type flexible subframe resource configuration of the third cell according to a first-type flexible subframe resource configured for the second cell.

Optionally, in an embodiment of the present disclosure, the determining, according to the first-type priority of each of the N flexible subframes and the second-type priority of each of the N flexible subframes, that each cell uses one or more of the N flexible subframes to perform data transmission includes: sequentially determining, from the N flexible subframes according to the first-type priority of each of the N flexible subframes and the flexible subframe resource requirement of the third cell, Q first-type flexible subframes as first-type flexible subframes of the third cell, where the flexible subframe resource requirement information of the third cell includes that the third cell requires Q first-type flexible subframes, and Q is a positive integer.

That is, a second-type flexible subframe of the third cell needs to be determined according to a second-type flexible subframe resource requirement of the third cell, the first-type flexible subframe resource configuration of the second cell, and a second-type priority of each subframe. A first-type flexible subframe of the third cell needs to be determined according to a first-type flexible subframe resource requirement of the third cell and the first-type priority of each subframe.

Optionally, in an embodiment of the present disclosure, the network device is a centralized controller, and the method further includes: sending the flexible subframe resource configuration of each cell to each of the multiple cells, where the flexible subframe resource configuration of each cell includes a first-type flexible subframe used by each cell for data transmission and a second-type flexible subframe used by each cell for data transmission.

That is, when the foregoing method is performed by a central controller of all the cells, after the central controller determines a flexible subframe configuration of each cell according to the subframe information of each of the multiple cells, the central controller needs to send a respective flexible subframe resource configuration to each cell, so that each cell uses one or more flexible subframes of the selectable N flexible subframes according to the flexible subframe configuration to perform data transmission.

In a TDD system, each cell dynamically adjusts a subframe configuration according to a service requirement of each cell. When a current configuration cannot meet a new service requirement, the current configuration is updated and the updated subframe configuration is used; or when a current configuration can meet a new service requirement, the currently used subframe configuration is not changed. With a given subframe configuration, each cell allocates, to a user of the local cell, a downlink (uplink) subframe corresponding to the subframe configuration of the local cell, so as to perform corresponding downlink (uplink) data transmission. When load of a cell is not heavy, there is a redundant downlink or uplink subframe. That is, because the load of the cell is not heavy, although the cell uses a specified subframe configuration, some downlink or uplink subframes in the configuration do not need to be used. In the prior art, because there is no coordination between all the cells and the cells independently use different subframe configurations and resource allocation, actual data transmission directions of a same subframe are different in different cells. Consequently, cross-subframe interference is caused, and a system capacity and user QoS are severely affected. The solution of the present disclosure is indented to improve a prior-art network resource allocation method, so that resource allocation is coordinated by fully using an idle subframe resource of each cell, thereby reducing as much cross-subframe interference of the cells as possible, and improving the system capacity.

In actual network running, when a cell is not heavily loaded, there is an idle subframe in a current subframe configuration of the cell. That is, in many cases, not all subframe resources of a cell need to be used for data sending. These idle resources may be used to coordinate resource allocation of different cells.

In this embodiment of the present disclosure, a flexible subframe resource requirement of each of the multiple neighboring cells is obtained, and the flexible subframe resource configurations of the cells are coordinated in a distributed manner according to the subframe configuration and the flexible subframe resource requirement of each cell, so that cross-subframe interference that may exist between flexible subframes can be reduced.

Figure 3A:
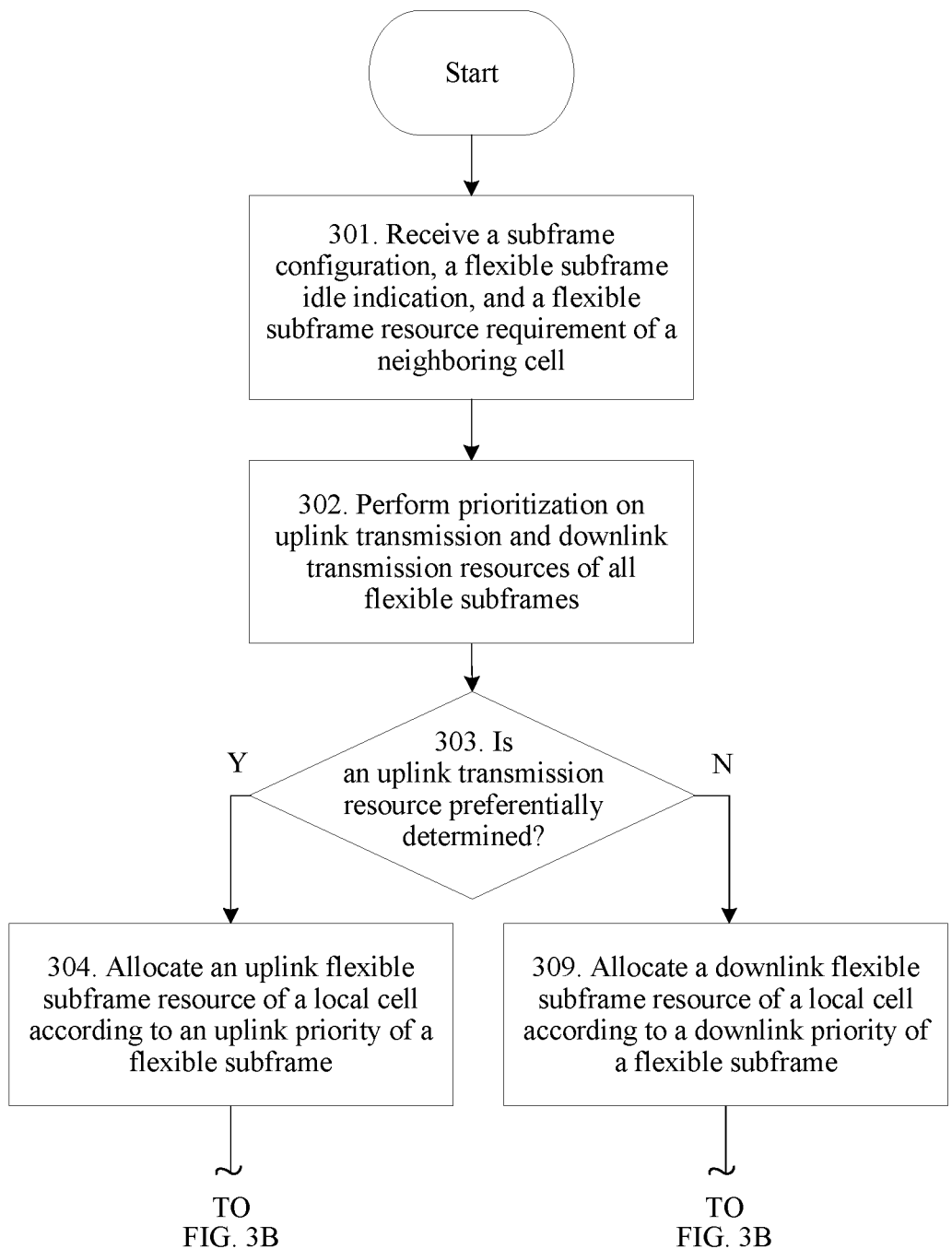
FIG. 3A and FIG. 3B are flowcharts of a resource configuration method according to an embodiment of the present disclosure.
Figure 3B:
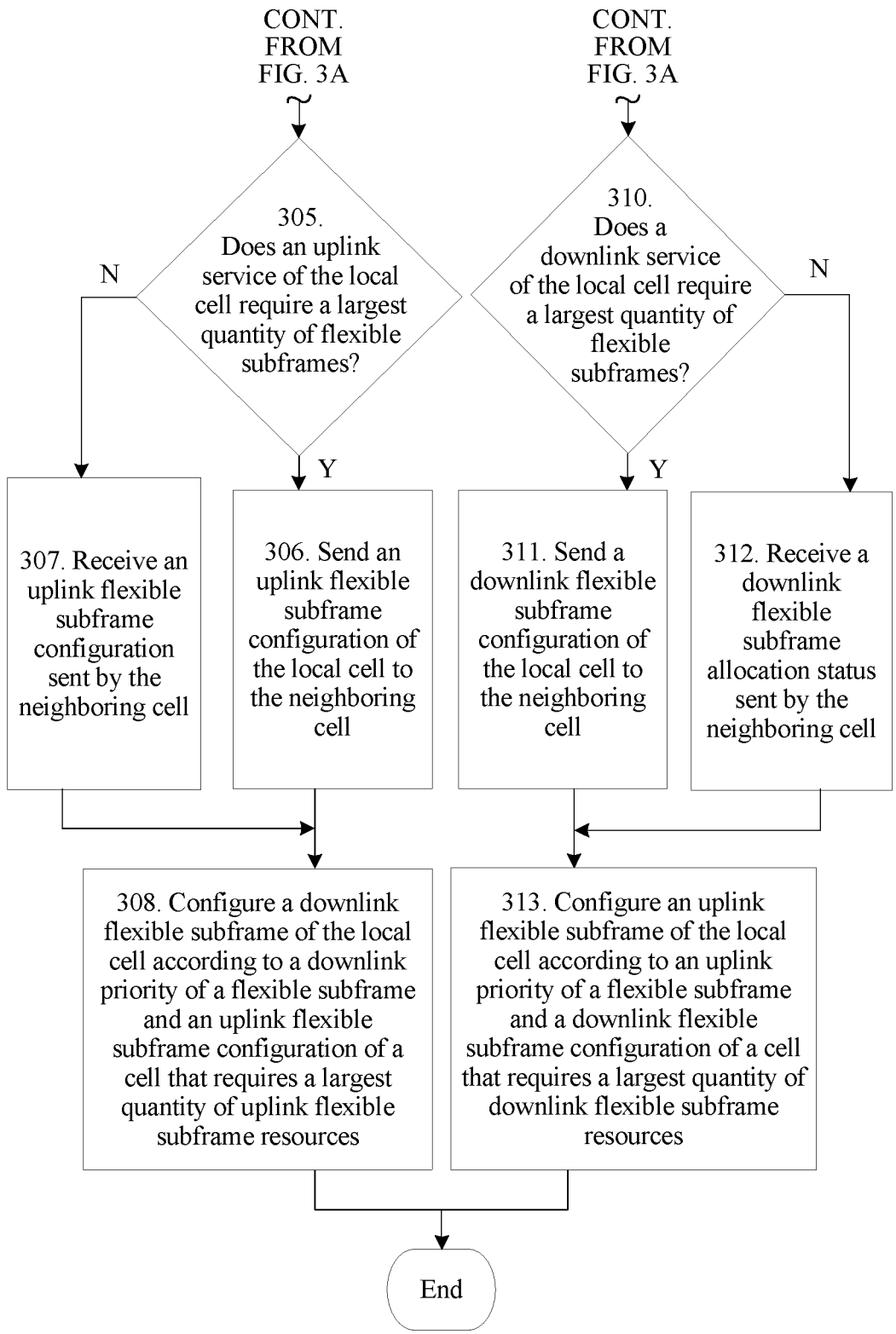

FIGS. 3A and 3B are flowcharts of a resource configuration method according to an embodiment of the present disclosure. The method is executed by any cell base station. As shown in FIGS. 3A and 3B, main steps are as follows.

301. Receive a subframe configuration, a flexible subframe idle indication, and a flexible subframe resource requirement of a neighboring cell.

That is, each cell may obtain a subframe configuration, uplink and downlink flexible subframe idle indications, and flexible subframe resource requirements of uplink and downlink services of a neighboring cell of the cell. The uplink and downlink flexible subframe idle indications are indications indicating whether a cell uses an uplink flexible subframe and/or a downlink flexible subframe in a used subframe configuration. For example, if a cell determines, according to a current service, that no uplink flexible subframe resource of the cell needs to be used, an uplink flexible subframe idle indication of the cell is 1; or if a cell determines, according to a current service, that an uplink flexible subframe resource of the cell needs to be used, an uplink flexible subframe idle indication of the cell is 0. Likewise, if a cell determines, according to a current service, that no downlink flexible subframe resource of the cell needs to be used, a downlink flexible subframe idle indication of the cell is 1; or if a cell determines, according to a current service, that a downlink flexible subframe resource of the cell needs to be used, a downlink flexible subframe idle indication of the cell is 0. The flexible subframe resource requirements of the uplink and downlink services are required uplink (or downlink) flexible subframe resources that remain from all resources required for uplink (or downlink) transmission of a cell, excluding a resource that can be provided by an uplink (or downlink) subframe in a fixed subframe of the cell. The resource requirement may be defined as an amount of uplink (or downlink) data that needs to be transmitted in a flexible subframe, a quantity of required uplink (or downlink) flexible subframes, or the like.

302. Perform prioritization on uplink transmission and downlink transmission resources of all flexible subframes.

Specifically, each cell prioritizes an uplink transmission resource and a downlink transmission resource of all flexible subframes according to a subframe configuration status of the local cell and the subframe configuration and the flexible subframe idle indication that are of the neighboring cell obtained in step 301. An objective of this step is to enable each cell to preferentially use, when a transmission resource is allocated for an uplink or downlink direction, a flexible subframe resource that has a same transmission direction as that of a neighbor, so as to avoid as much cross-subframe interference between cells as possible.

303. Determine, according to a network policy, whether to preferentially determine an uplink transmission resource, where the network policy is determined according to an operator policy or a network status. The determining, according to a network policy, whether to preferentially determine an uplink transmission resource is: determining, according to the network policy, whether to preferentially configure a flexible subframe for uplink transmission.

In step 303, if it is determined that an uplink transmission resource is preferentially configured, step 304 needs to be performed.

304. Configure an uplink flexible subframe resource of a local cell according to an uplink priority of a flexible subframe, and select, from multiple flexible subframes, a flexible subframe used for uplink data transmission.

305. Determine whether an uplink service of the local cell requires a largest quantity of flexible subframes, that is, determine whether the uplink service of the local cell requires a largest quantity of flexible subframe resources, or whether a data amount of uplink service transmission of the local cell is the largest.

306. When the uplink service of the local cell requires the largest quantity of flexible subframe resources, send an uplink flexible subframe allocation status of the local cell to the neighboring cell, and further allocate a downlink transmission resource of the local cell according to a downlink resource priority of each flexible subframe.

307. When the uplink service of the local cell does not require the largest quantity of flexible subframe resources, receive an uplink flexible subframe allocation status sent by the neighboring cell, that is, receive a downlink flexible subframe allocation status sent by a cell that is in the neighboring cell and that requires a largest quantity of uplink flexible subframes.

308. Configure a downlink flexible subframe of the local cell according to a downlink priority of each flexible subframe and an uplink flexible subframe configuration of a cell that requires a largest quantity of uplink flexible subframe resources. Specifically, the local cell needs to select a downlink flexible subframe from a flexible subframe other than an uplink flexible subframe selected by the cell that requires the largest quantity of uplink flexible subframe resources.

In step 303, if it is determined that a downlink transmission resource, instead of an uplink transmission resource, needs to be preferentially configured, step 309 needs to be preferentially performed.

309. Allocate a downlink flexible subframe resource of a local cell according to a downlink priority of a flexible subframe.

310. Determine whether a downlink service of the local cell requires a largest quantity of flexible subframe resources.

311. If the downlink service of the local cell requires the largest quantity of flexible subframe resources, send a downlink flexible subframe configuration of the local cell to the neighboring cell, and further configure an uplink transmission resource for the local cell according to an uplink priority ranking of each flexible subframe.

312. If the downlink service of the local cell does not require the largest quantity of flexible subframe resources, receive a downlink flexible subframe allocation status sent by the neighboring cell, that is, receive a downlink flexible subframe configuration sent by a cell that is in the neighboring cell and that requires a largest quantity of downlink flexible subframes.

313. Configure an uplink flexible subframe for the local cell according to an uplink priority of each flexible subframe and the downlink flexible subframe configuration of the cell that requires a largest quantity of downlink flexible subframe resources. Specifically, the local cell needs to select an uplink flexible subframe from a flexible subframe other than a downlink flexible subframe selected by the cell that requires the largest quantity of downlink flexible subframe resources.

Whether to preferentially determine an uplink transmission resource in step 303 may be adjusted according to an operator policy or a current network running status. For example, if as much cross-subframe interference of uplink transmission to downlink transmission between cells as possible needs to be preferentially avoided as required by an operator policy, a downlink transmission resource is first configured; otherwise, if as much cross-subframe interference of downlink transmission to uplink transmission between cells as possible needs to be preferentially avoided, an uplink transmission resource is first configured. Alternatively, in a current network, a network status is obtained by collecting statistics about an interference status of transmission of users in each cell. In the network, if interference generated when a user receives downlink transmission is severer than that generated when each cell receives uplink transmission from a user, a downlink transmission resource is first configured. Otherwise, if interference generated when each cell receives uplink transmission from a user is severer than that generated when a user receives downlink transmission, an uplink transmission resource is first configured.

In a TDD system, each cell dynamically adjusts a subframe configuration according to a service requirement of each cell. When a current configuration cannot meet a new service requirement, the current configuration is updated and the updated subframe configuration is used; or when a current configuration can meet a new service requirement, the currently used subframe configuration is not changed. With a given subframe configuration, each cell allocates, to a user of the local cell, a downlink (uplink) subframe corresponding to the subframe configuration of the local cell, so as to perform corresponding downlink (uplink) data transmission. When load of a cell is not heavy, there is a redundant downlink or uplink subframe. That is, because the load of the cell is not heavy, although the cell uses a specified subframe configuration, some downlink or uplink subframes in the configuration do not need to be used. In the prior art, because there is no coordination between all the cells and the cells independently use different subframe configurations and resource allocation, actual data transmission directions of a same subframe are different in different cells. Consequently, cross-subframe interference is caused, and a system capacity and user QoS are severely affected. The solution of the present disclosure is indented to improve a prior-art network resource allocation method, so that resource allocation is coordinated by fully using an idle subframe resource of each cell, thereby reducing as much cross-subframe interference of the cells as possible, and improving the system capacity.

In actual network running, when a cell is not heavily loaded, there is an idle subframe in a current subframe configuration of the cell. That is, in many cases, not all subframe resources of a cell need to be used for data sending. These idle resources may be used to coordinate resource allocation of different cells.

In this embodiment of the present disclosure, a flexible subframe resource requirement of each of multiple neighboring cells is obtained, and flexible subframe resource configurations of the cells are coordinated in a distributed manner according to a subframe configuration and the flexible subframe resource requirement of each cell, so that cross-subframe interference that may exist between flexible subframes can be reduced.

Figure 4:
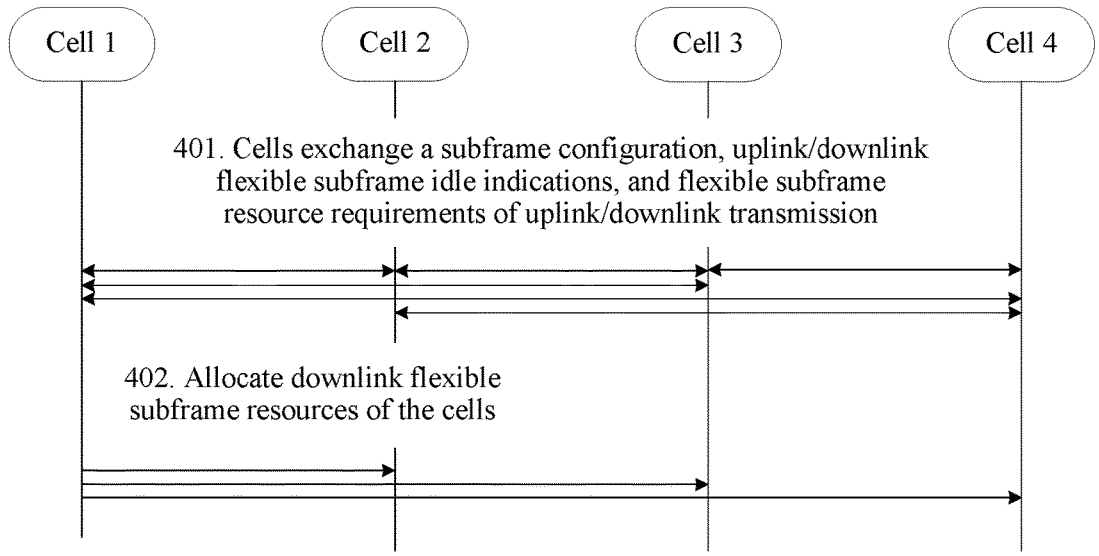
FIG. 4 is a schematic flowchart of an information exchange method according to an embodiment of the present disclosure.

FIG. 4 is a schematic flowchart of an information exchange method according to an embodiment of the present disclosure. As shown in FIG. 4, it is assumed that there are four cells. A cell 1 is a cell that requires a largest quantity of downlink flexible subframe resources. When a network policy is to preferentially configure a downlink transmission resource, the method includes the following steps.

401. Cells exchange respective subframe information of the cells, where the subframe information includes subframe configuration information, uplink and downlink flexible subframe idle indications, and flexible subframe resource requirements of uplink and downlink services.

402. A cell that requires a largest quantity of downlink flexible subframe resources sends a downlink flexible subframe allocation situation of the local cell to another cell.

Specifically, in step 401, the cells exchange the respective subframe information of the cells, so that each cell determines an uplink priority and a downlink priority of each flexible subframe according to subframe information of each cell.

Before step 402, the cell that requires the largest quantity of downlink flexible subframes performs a downlink flexible subframe resource configuration and an uplink flexible subframe resource configuration on the local cell according to the uplink priority and the downlink priority of each flexible subframe, that is, selects, from multiple selectable flexible subframes, an uplink flexible subframe and a downlink flexible subframe that are used for data transmission.

After step 402, another neighboring cell that does not require the largest quantity of downlink flexible subframe resources needs to determine an uplink flexible subframe resource configuration of the cell according to the downlink flexible subframe resource configuration of the cell that requires the largest quantity of downlink flexible subframe resources. In addition, each neighboring cell determines a respective downlink flexible subframe resource configuration from the multiple selectable flexible subframes according to the downlink priority of each flexible subframe.

In this embodiment of the present disclosure, a flexible subframe resource requirement of each of multiple neighboring cells is obtained, and flexible subframe resource configurations of the cells are coordinated in a distributed manner according to a subframe configuration and the flexible subframe resource requirement of each cell, so that cross-subframe interference that may exist between flexible subframes can be reduced.

Figure 5:
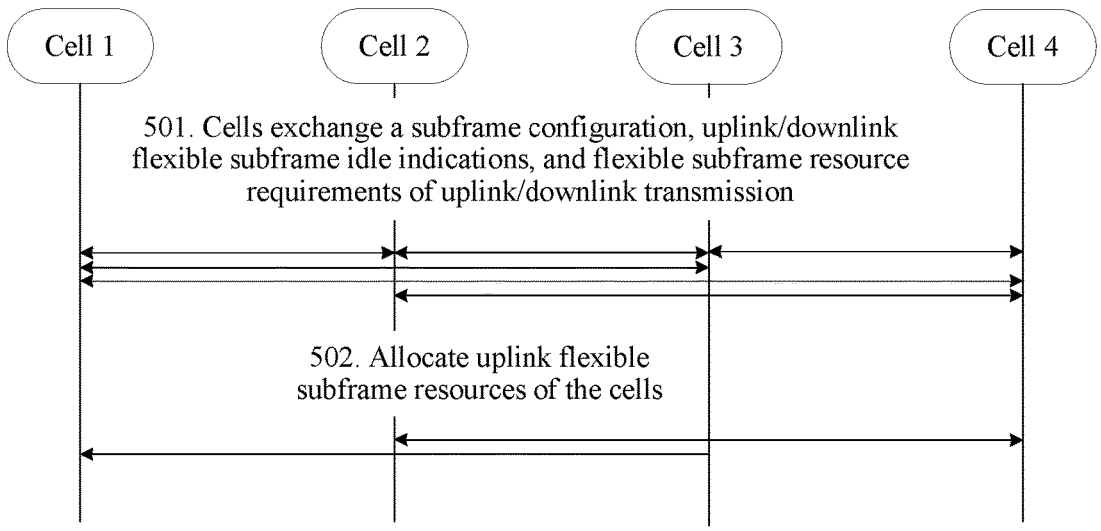
FIG. 5 is a schematic flowchart of an information exchange method according to an embodiment of the present disclosure.

FIG. 5 is a schematic flowchart of an information exchange method according to an embodiment of the present disclosure. As shown in FIG. 5, it is assumed that there are four cells. A cell 3 is a cell that requires a largest quantity of uplink flexible subframe resources. When a network policy is to preferentially configure an uplink transmission resource, the method includes the following steps.

501. Cells exchange respective subframe information of the cells, where the subframe information includes subframe configuration information, uplink and downlink flexible subframe idle indications, and flexible subframe resource requirements of uplink and downlink services.

502. A cell that requires a largest quantity of uplink flexible subframe resources sends an uplink flexible subframe resource allocation status of the local cell to another cell.

Specifically, in step 501, the cells exchange the respective subframe information of the cells, so that each cell determines an uplink priority and a downlink priority of each flexible subframe according to subframe information of each cell.

Before step 502, the cell that requires the largest quantity of uplink flexible subframes performs an uplink flexible subframe resource configuration and a downlink flexible subframe resource configuration on the local cell according to the uplink priority and the downlink priority of each flexible subframe, that is, selects, from multiple selectable flexible subframes, an uplink flexible subframe and a downlink flexible subframe that are used for data transmission.

After step 502, another neighboring cell that does not require the largest quantity of uplink flexible subframe resources needs to determine a downlink flexible subframe resource configuration of the cell according to the uplink flexible subframe resource configuration of the cell that requires the largest quantity of uplink flexible subframe resources. In addition, each neighboring cell determines a respective uplink flexible subframe resource configuration from the multiple selectable flexible subframes according to the uplink priority of each flexible subframe.

In this embodiment of the present disclosure, a flexible subframe resource requirement of each of multiple neighboring cells is obtained, and flexible subframe resource configurations of the cells are coordinated in a distributed manner according to a subframe configuration and the flexible subframe resource requirement of each cell, so that cross-subframe interference that may exist between flexible subframes can be reduced.

Figure 6:
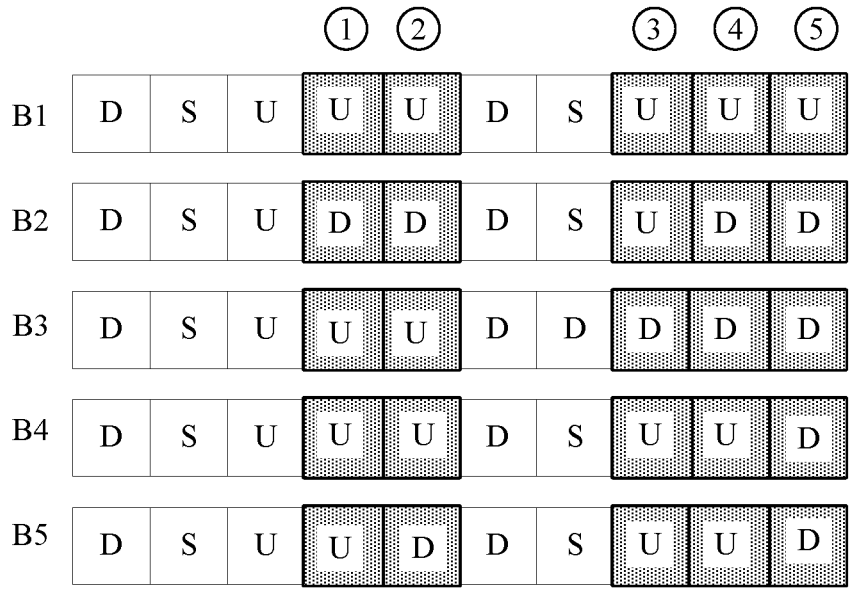
FIG. 6 is a schematic diagram of a subframe configuration according to an embodiment of the present disclosure.

FIG. 6 is a schematic diagram of a subframe configuration according to an embodiment of the present disclosure. It is assumed that there are five neighboring cells B1 to B5 in a network, and a subframe configuration currently used by each cell is shown in FIG. 6. Subframes numbered ①, ②, ③, ④, and ⑤ are flexible subframes, and a remaining subframe is a fixed subframe.

Specifically, it may be learned according to subframe configurations of the five flexible subframes ① to ⑤ that, the flexible subframe ⑤ is configured as a downlink subframe in four cells B2, B3, B4, and B5, the flexible subframe ② is configured as a downlink subframe in two cells B2 and B5, the flexible subframe ④ is configured as a downlink subframe in two cells B2 and B3, and the flexible subframes ① and ③ are configured as downlink subframes in B2 and B3 respectively. Therefore, for downlink data transmission, the flexible subframe ⑤ has a highest priority, priorities of the flexible subframes ② and ④ are ranked the second, and priorities of the flexible subframe ① and the flexible subframe ③ are ranked the third.

Specifically, it may be learned according to the subframe configurations of the five flexible subframes ① to ⑤ that, the flexible subframes ① and ③ are configured as uplink subframes in four cells, the flexible subframes ② and ④ are configured as uplink subframes in three cells, the flexible subframe ⑤ is configured as an uplink subframe in two cells. Therefore, for uplink data transmission, the flexible subframes ① and ⑤ have a highest priority, followed by the flexible subframes ② and ④, and a ranking of the flexible subframe ⑤ is the lowest.

In conclusion, Table 1 below may be obtained.

TABLE 1

|  | Priority 1 | Priority 2 | Priority 3 |
|---|---|---|---|
| Downlink transmission | ⑤ | ② ④ | ① ③ |
| Uplink transmission | ① ③ | ② ④ | ⑤ |

Figure 7:
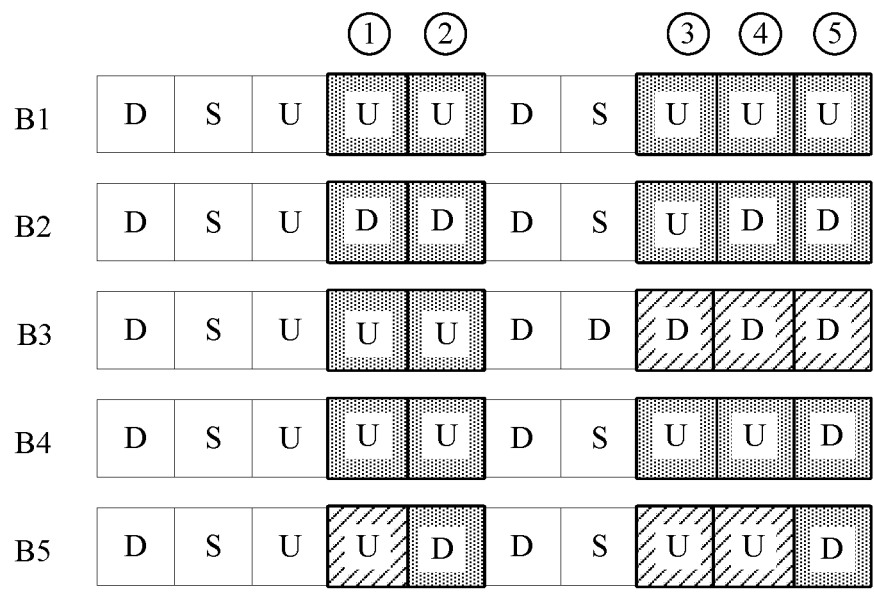
FIG. 7 is a schematic diagram of a subframe configuration according to an embodiment of the present disclosure.

FIG. 7 is a schematic diagram of a subframe configuration according to an embodiment of the present disclosure. It is assumed that there are five neighboring cells B1 to B5 in a network, and a subframe configuration currently used by each cell is shown in FIG. 7. Subframes numbered ①, ②, ③, ④, and ⑤ are flexible subframes, and a remaining subframe is a fixed subframe. In addition, a downlink flexible subframe of the cell B3 and an uplink flexible subframe of the cell B5 are indicated as idle subframes. Therefore, when the five flexible subframes ① to ⑤ are prioritized, the idle subframes need to be excluded.

Specifically, it may be learned according to subframe configurations of the five flexible subframes ① to ⑤ that, the flexible subframe ⑤ is configured as a downlink subframe in three cells, the flexible subframe ② is configured as a downlink subframe in two cells, the flexible subframe ④ and the flexible subframe ① are configured as downlink subframes in one cell, and the flexible subframe ③ is not configured as a downlink subframe in any cell. Therefore, for downlink data transmission, the flexible subframe ⑤ has a highest priority, a priority of the flexible subframes ② is ranked the second, and priorities of the flexible subframe ① and the flexible subframe ④ are ranked the third.

Specifically, it may be learned according to the subframe configurations of the five flexible subframes ① to ⑤, that, the flexible subframes ①, ②, and ③ are configured as uplink subframes in three cells, the flexible subframe ④ is configured as an uplink subframe in two cells, the flexible subframe ⑤ is configured as an uplink subframe in one cell. Therefore, for uplink data transmission, the flexible subframes ①, ②, and ③ have a highest priority, followed by the flexible subframe ④, and a ranking of the flexible subframe ⑤ is the lowest.

In conclusion, Table 2 below may be obtained.

TABLE 2

|  | Priority 1 | Priority 2 | Priority 3 |
|---|---|---|---|
| Downlink transmission | ⑤ | ② | ① ④ |
| Uplink transmission | ① ② ③ | ④ | ⑤ |

Step 1: Cells exchange subframe information of all the cells. The subframe information includes subframe configurations of the five flexible subframes ①, ②, ③, ④, and ⑤ in each cell, that is, whether the flexible subframes are configured as uplink subframes or downlink subframes. The subframe information further includes a flexible subframe resource requirement of each cell, that is, a quantity of required flexible subframes. According to the subframe information of each cell, it is determined that the cell B1 needs to use a largest quantity of uplink flexible subframe resources or uplink flexible subframes in addition to an uplink subframe in a fixed subframe, B1 needs to use two uplink flexible subframes, B2, B3, and B4 need to use one uplink flexible subframe, and the cell B5 does not require an uplink flexible subframe resource; and it is determined that the cell B2 needs to use a largest quantity of downlink flexible subframes or downlink flexible subframe resources in addition to a downlink subframe in a fixed subframe, B2 needs to use two downlink flexible subframes, and B4 and B5 each need to use one downlink flexible subframe.

Step 2: Each cell prioritizes uplink and downlink transmission resources of all flexible subframes according to a subframe configuration and an idle flexible subframe resource status of a neighboring cell. For example, rankings of uplink transmission resources in flexible subframes in B4 are ①=②=③>④>⑤ (as shown in FIG. 7, uplink transmission may be performed in subframes ①, ②, and ③ in totally three cells; uplink transmission may be performed in the subframe ④ in totally two cells; and uplink transmission may be performed in the subframe ⑤ in totally one cell); rankings of downlink transmission resources are ⑤>②>①=④ (as shown in FIG. 7, downlink transmission may be performed in the subframe ⑤ in totally three cells; downlink transmission may be performed in the subframe ② in totally two cells; and downlink transmission may be performed in the subframes ① and ④ in totally one cell). Priority rankings of the subframes are shown in Table 2.

Step 3: When a network policy is to preferentially configure a downlink flexible subframe resource, a cell that requires the largest quantity of downlink flexible subframe resources allocates a resource for downlink transmission of the local cell according to a downlink resource priority of a flexible subframe, and sends, to a neighboring cell, a downlink flexible subframe that needs to be used by the local cell. For example, the cell B2 that requires the largest quantity of downlink flexible subframe resources allocates subframes ⑤ and ② for downlink transmission of the local cell according to downlink transmission resource priority rankings, and sends, to a neighboring cell, a downlink flexible subframe resource allocation status of the cell B2.

Further, an uplink flexible subframe resource configuration of B is determined according to a quantity of uplink flexible resources required by the cell B2 and an uplink priority ranking of each flexible subframe. Specifically, B2 configures ③ as a flexible subframe of an uplink transmission resource of the local cell.

Step 4: A cell that does not require the largest quantity of downlink flexible subframe resources allocates a corresponding flexible subframe for uplink transmission of the local cell according to the subframe resource priority rankings in step 2, an available flexible subframe status of the local cell, and a downlink flexible subframe configuration sent by the cell that requires the largest quantity of downlink flexible subframe resources. Specifically, for example, the cell B1 that requires a largest quantity of uplink flexible subframe resources allocates subframes ① and ③ for uplink transmission of the local cell according to uplink transmission resource priority rankings and the received downlink flexible subframe resource allocation status. It should be noted that because ② is allocated by the cell B2 for downlink transmission, ② is excluded when uplink resource allocation is performed in the cell B1. Therefore, B2 configures ③ as an uplink transmission resource of the local cell, B3 configures ① as an uplink transmission resource of the local cell, and B4 configures ① as an uplink transmission resource of the local cell.

Figure 8:
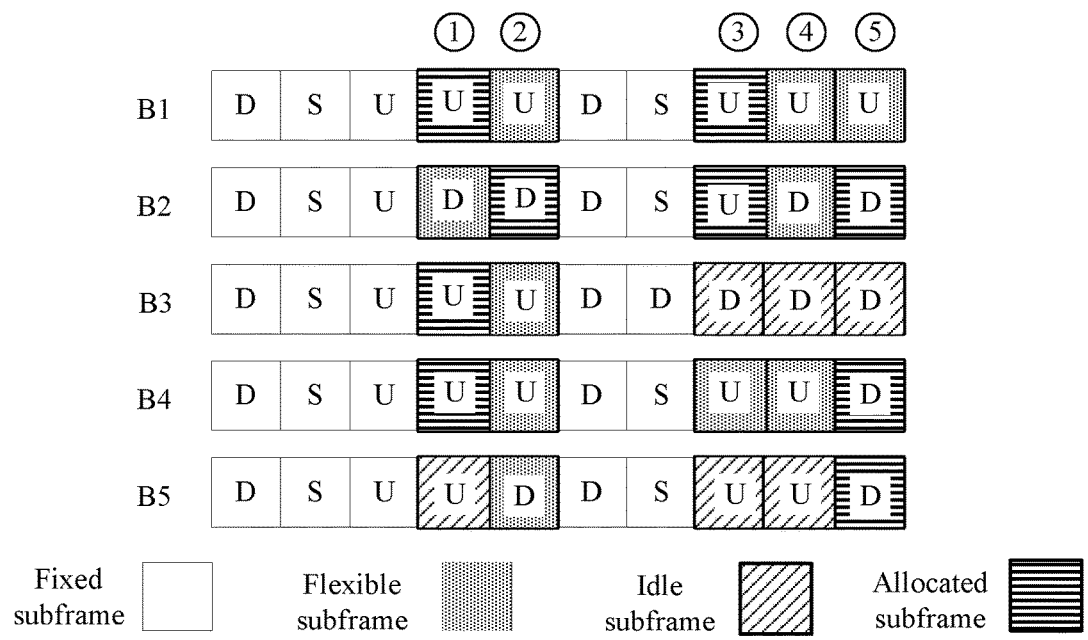
FIG. 8 is a schematic diagram of a subframe configuration according to an embodiment of the present disclosure.

Further, each cell that does not require the largest quantity of downlink flexible subframe resources performs a respective downlink flexible subframe resource configuration according to a respective downlink flexible subframe resource requirement and downlink priority rankings of the foregoing flexible subframes. For example, B4 configures the flexible subframe ⑤ as a downlink transmission resource of the local cell, and B5 configures the flexible subframe ⑤ as a downlink transmission resource of the local cell. After this step is performed, resource allocation of each cell in the network is shown in FIG. 8. FIG. 8 is a schematic diagram of a subframe configuration according to an embodiment of the present disclosure. In this step, allocation decisions made by all cells on their respective flexible subframe resources are all made in a distributed manner without coordination.

Optionally, in an embodiment of the present disclosure, the subframe information of each cell does not include an idle subframe indication. Specially, when a flexible subframe resource requirement of uplink transmission of a cell is 0, correspondingly, the cell does not need to use an uplink flexible subframe resource, that is, an uplink flexible subframe of the cell is idle. Likewise, when a flexible subframe resource requirement of downlink transmission of a cell is 0, correspondingly, the cell does not need to use a downlink flexible subframe resource, that is, a downlink flexible subframe of the cell is idle. Therefore, in Embodiment 2, each cell determines, according to whether respective flexible subframe resource requirements of uplink and downlink transmission or flexible subframe resource requirements of uplink and downlink transmission, sent by a neighboring cell are 0, whether uplink and downlink flexible subframes of the corresponding cell are idle, so as to achieve a same effect as that in Embodiment 1.

It should be understood that, in step 3 and step 4, it may be determined, according to a network policy, that an uplink flexible subframe resource is preferentially configured. In step 3, a cell that requires a largest quantity of uplink flexible subframes needs to be preferentially determined, and an uplink flexible subframe resource configuration of the cell needs to be sent to another neighboring cell. In step 4, a cell that does not require the largest quantity of uplink flexible subframes needs to perform a downlink flexible subframe resource configuration according to the flexible subframe resource configuration of the cell that requires the largest quantity of uplink flexible subframes. This method is similar to the foregoing method, and is not described herein.

In a TDD system, each cell dynamically adjusts a subframe configuration according to a service requirement of each cell. When a current configuration cannot meet a new service requirement, the current configuration is updated and the updated subframe configuration is used; or when a current configuration can meet a new service requirement, the currently used subframe configuration is not changed. With a given subframe configuration, each cell allocates, to a user of the local cell, a downlink (uplink) subframe corresponding to the subframe configuration of the local cell, so as to perform corresponding downlink (uplink) data transmission. When load of a cell is not heavy, there is a redundant downlink or uplink subframe timeslot. That is, because the load of the cell is not heavy, although the cell uses a specified subframe configuration, some downlink or uplink subframes in the configuration do not need to be used. In the prior art, because there is no coordination between all the cells and the cells independently use different subframe configurations and resource allocation, actual data transmission directions of a same subframe are different in different cells. Consequently, cross-subframe interference is caused, and a system capacity and user QoS are severely affected. The solution of the present disclosure is indented to improve a prior-art network resource allocation method, so that resource allocation is coordinated by fully using an idle subframe resource of each cell, thereby reducing as much cross-subframe interference of the cells as possible, and improving the system capacity.

In actual network running, when a cell is not heavily loaded, there is an idle subframe in a current subframe configuration of the cell. That is, in many cases, not all subframe resources of a cell need to be used for data sending. These idle resources may be used to coordinate resource allocation of different cells.

In this embodiment of the present disclosure, a flexible subframe resource requirement of each of the multiple neighboring cells is obtained, and the flexible subframe resource configurations of the cells are coordinated in a distributed manner according to the subframe configuration and the flexible subframe resource requirement of each cell, so that cross-subframe interference that may exist between flexible subframes can be reduced.

Further, the solution of the present disclosure provides a TDD network resource allocation method, so that flexible subframes of a cell can be fully used to allocate resources to uplink and downlink services of the cell, so as to avoid as much cross-subframe interference between cells as possible, and effectively improve user service QoS and a system capacity.

FIG. 2 to FIG. 8 discuss a resource configuration method in a TDD mode in detail. The following discusses a resource configuration network device in detail with reference to FIG. 9 to FIG. 10.

Figure 9:
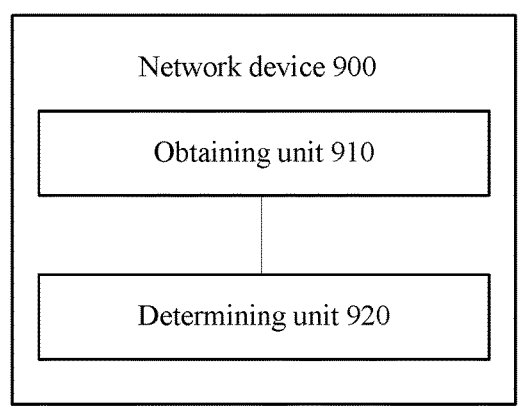
FIG. 9 is a schematic block diagram of a network device according to an embodiment of the present disclosure.

FIG. 9 is a schematic block diagram of a network device according to an embodiment of the present disclosure. As shown in FIG. 9, the network device 900 includes:

an obtaining unit 910, where the obtaining unit 910 is configured to obtain subframe information of each of multiple cells, where the subframe information of each of the multiple cells includes subframe configuration information and flexible subframe resource requirement information of each cell, the subframe configuration information of each cell includes a configuration of each of N flexible subframes in each cell, the configuration of each flexible subframe includes that the flexible subframe is configured as an uplink subframe or a downlink subframe, the flexible subframe resource requirement information of each cell includes at least one of the following: a quantity of flexible subframes that are configured as uplink subframes and that are required by each cell, or a quantity of flexible subframes that are configured as downlink subframes and that are required by each cell, and N is a positive integer; and a processing unit 920, where the processing unit 920 is configured to determine a flexible subframe resource configuration of each of the multiple cells according to the subframe information of each of the multiple cells, where the flexible subframe resource configuration of each cell includes that each cell uses one or more of the N flexible subframes to perform data transmission.

It should be understood that the network device 900 may be a central controller that manages the multiple cells, to configure flexible subframe resources of all the multiple cells, for example, may be a base station unit or a control unit that coordinates and controls the multiple cells; or the network device 900 may be a cell base station, where the cell base station can only configure a flexible subframe resource configuration of a cell served by the cell base station. This is not limited in the present disclosure.

A subframe configuration of each of the multiple cells includes a fixed subframe configuration and a flexible subframe configuration of the cell. Fixed subframes are fixedly configured as uplink or downlink subframes in different cells, and the fixed subframes have same configurations in different cells. Flexible subframes may be configured as uplink or downlink subframes flexibly in different cells. Therefore, the subframe configuration information of each cell includes configuration information of each flexible subframe. This means that the subframe configuration information includes information about whether each flexible subframe is configured as an uplink subframe or a downlink subframe in each cell.

A flexible subframe resource requirement of each cell includes at least one of the following: a quantity of flexible subframes that need to be configured as uplink subframes, or a quantity of flexible subframes that need to be configured as downlink subframes. That is, a quantity of flexible subframes that need to be configured as uplink subframes in a cell represents a requirement of the cell for an uplink transmission resource or an amount of data to be transmitted in uplink data transmission; a quantity of flexible subframes that need to be configured as downlink subframes in a cell represents a requirement of the cell for a downlink transmission resource or an amount of data to be transmitted in downlink data transmission. Specifically, a requirement of an uplink service for an uplink flexible subframe resource is flexible subframe resources that need to be configured as uplink subframes and that remain from all resources required for uplink transmission of a cell, excluding a resource that can be provided by an uplink fixed subframe of the cell; a requirement of a downlink service for a downlink flexible subframe resource is flexible subframe resources that need to be configured as downlink subframes and that remain from all resources required for downlink transmission of a cell, excluding a resource that can be provided by a downlink fixed subframe of the cell.

In this embodiment of the present disclosure, the flexible subframe resource requirement of each of multiple neighboring cells is obtained, and the flexible subframe resource configurations of the cells are coordinated in a distributed manner according to the subframe configuration and the flexible subframe resource requirement of each cell, so that cross-subframe interference that may exist between flexible subframes can be reduced.

Optionally, in an embodiment of the present disclosure, the processing unit 920 is specifically configured to: determine a first-type priority of each of the N flexible subframes according to the subframe information of each of the multiple cells, where a larger quantity of cells in which an $i^{th}$ flexible subframe is configured as a first-type flexible subframe in the multiple cells indicates a higher first-type priority of the $i^{th}$ flexible subframe, the first-type flexible subframe is a flexible subframe that is configured as an uplink subframe or a flexible subframe that is configured as a downlink subframe, $1 \leq i \leq N$, and i is an integer; determine a second-type priority of each of the N flexible subframes according to the subframe information of each of the multiple cells, where a larger quantity of cells in which a $j^{th}$ flexible subframe is configured as a second-type flexible subframe in the multiple cells indicates a higher second-type priority of the $j^{th}$ flexible subframe, the second-type flexible subframe and the first-type flexible subframe are configured differently, $1 \leq j \leq N$, and j is an integer; and determine, according to the first-type priority of each of the N flexible subframes and the second-type priority of each of the N flexible subframes, that each cell uses one or more of the N flexible subframes to perform data transmission.

Optionally, in an embodiment of the present disclosure, the processing unit 920 is specifically configured to: the subframe information of each cell includes an idle subframe indication, the idle subframe indication is used to indicate that a corresponding cell sets at least one of the first-type flexible subframe or the second-type flexible subframe in the N flexible subframes to an idle subframe, and the determining unit is further configured to: determine that the prioritization is not performed on the idle subframe.

Optionally, in an embodiment of the present disclosure, the multiple cells include a first cell, a first-type flexible subframe resource requirement of the first cell is 0, and the processing unit 920 is specifically configured to determine that the prioritization is not performed on a first-type flexible subframe of the first cell.

Optionally, in an embodiment of the present disclosure, the multiple cells include a second cell and a third cell, and the processing unit 920 is specifically configured to: determine, from the N flexible subframes, M first-type flexible subframes required by the second cell, where a flexible subframe resource requirement of the second cell includes that the second cell requires M first-type flexible subframes, and M is a positive integer; and determine, from N–M flexible subframes other than the M flexible subframes according to the M first-type flexible subframes required by the second cell, L second-type flexible subframes required by the third cell, where a flexible subframe resource requirement of the third cell includes that the third cell requires L second-type flexible subframes, and L is a positive integer.

Optionally, in an embodiment of the present disclosure, the processing unit 920 is specifically configured to determine, according to the flexible subframe resource requirement information of each of the multiple cells, that the second cell is a cell that requires a largest quantity of first-type flexible subframes.

Optionally, in an embodiment of the present disclosure, the processing unit 920 is specifically configured to sequentially determine, from the N flexible subframes according to the first-type priority of each of the N flexible subframes, the M first-type flexible subframes as first-type flexible subframes of the second cell.

Optionally, in an embodiment of the present disclosure, the processing unit 920 is specifically configured to sequentially determine, from the N flexible subframes according to the second-type priority of each of the N flexible subframes and the flexible subframe resource requirement of the second cell, P second-type flexible subframes as second-type flexible subframes of the second cell, where the flexible subframe resource requirement information of the second cell includes that the second cell requires P second-type flexible subframes, and P is a positive integer.

Optionally, in an embodiment of the present disclosure, the network device 900 further includes: a first sending unit, where the first sending unit is configured to send a first-type flexible subframe resource configuration of the second cell to each of the at least one neighboring cell, where the first-type flexible subframe resource configuration of the second cell includes that the second cell uses the M first-type flexible subframes to perform data transmission.

Optionally, in an embodiment of the present disclosure, the processing unit 920 is specifically configured to determine, according to the flexible subframe resource requirement information of each of the multiple cells, that the third cell is not the cell that requires the largest quantity of first-type flexible subframes.

Optionally, in an embodiment of the present disclosure, the processing unit 920 is specifically configured to sequentially determine the L second-type flexible subframes of the third cell from the remaining N–M flexible subframes other than the M first-type flexible subframes according to the second-type priority of each of the N flexible subframes, the flexible subframe resource requirement of the third cell, and the M first-type flexible subframes required by the second cell.

Optionally, in an embodiment of the present disclosure, the processing unit 920 is specifically configured to sequentially determine, from the N flexible subframes according to the first-type priority of each of the N flexible subframes and the flexible subframe resource requirement of the third cell, Q first-type flexible subframes as first-type flexible subframes of the third cell, where the flexible subframe resource requirement information of the third cell includes that the third cell requires Q first-type flexible subframes, and Q is a positive integer.

Optionally, in an embodiment of the present disclosure, the network device is a centralized controller, and the network device 900 further includes: a second sending unit, where the second sending unit is configured to send the flexible subframe resource configuration of each cell to each of the multiple cells, where the flexible subframe resource configuration of each cell includes a first-type flexible subframe used by each cell for data transmission and a second-type flexible subframe used by each cell for data transmission.

In a TDD system, each cell dynamically adjusts a subframe configuration according to a service requirement of each cell. When a current configuration cannot meet a new service requirement, the current configuration is updated and the updated subframe configuration is used; or when a current configuration can meet a new service requirement, the currently used subframe configuration is not changed. With a given subframe configuration, each cell allocates, to a user of the local cell, a downlink (uplink) subframe corresponding to the subframe configuration of the local cell, so as to perform corresponding downlink (uplink) data transmission. When load of a cell is not heavy, there is a redundant downlink or uplink subframe timeslot. That is, because the load of the cell is not heavy, although the cell uses a specified subframe configuration, some downlink or uplink subframes in the configuration do not need to be used. In the prior art, because there is no coordination between all the cells and the cells independently use different subframe configurations and resource allocation, actual data transmission directions of a same subframe are different in different cells. Consequently, cross-subframe interference is caused, and a system capacity and user QoS are severely affected. The solution of the present disclosure is indented to improve a prior-art network resource allocation method, so that resource allocation is coordinated by fully using an idle subframe resource of each cell, thereby reducing as much cross-subframe interference of the cells as possible, and improving the system capacity.

In actual network running, when a cell is not heavily loaded, there is an idle subframe in a current subframe configuration of the cell. That is, in many cases, not all subframe resources of a cell need to be used for data sending. These idle resources may be used to coordinate resource allocation of different cells.

In this embodiment of the present disclosure, the flexible subframe resource requirement of each of multiple neighboring cells is obtained, and the flexible subframe resource configurations of the cells are coordinated in a distributed manner according to the subframe configuration and the flexible subframe resource requirement of each cell, so that cross-subframe interference that may exist between flexible subframes can be reduced.

Figure 10:
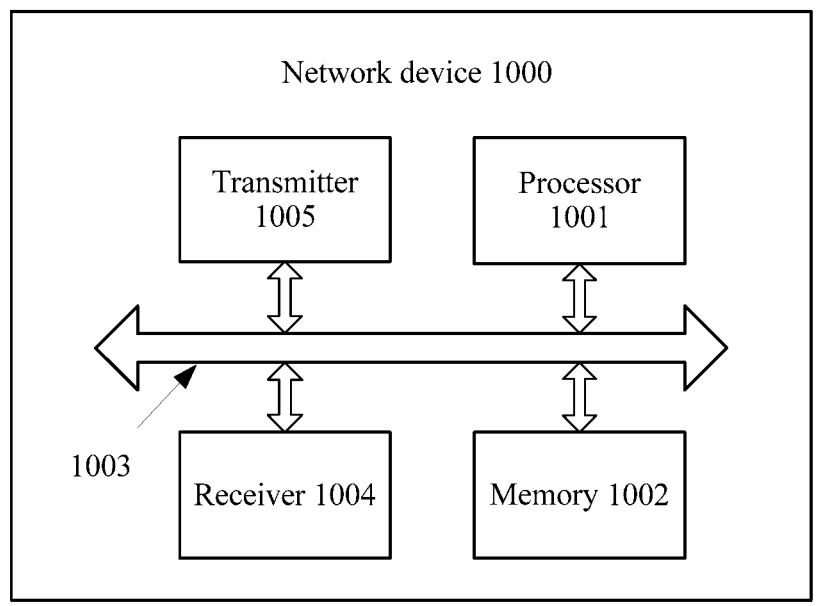
FIG. 10 is a schematic apparatus diagram of a network device according to an embodiment of the present disclosure.

FIG. 10 is a schematic apparatus diagram of a network device 1000 according to another embodiment of the present disclosure. The network device 1000 may be a central controller. The network device 1000 includes a processor 1001, a memory 1002, a bus system 1003, a receiver 1004, and a transmitter 1005. The processor 1001, the memory 1002, and the receiver 1004 are connected by using the bus system 1003. The memory 1002 is configured to store an instruction, and the processor 1001 is configured to execute the instruction stored in the memory 1002, so as to control the receiver 1004 to receive information. The receiver 1004 is configured to obtain subframe information of each of multiple cells, where the subframe information of each of the multiple cells includes subframe configuration information and flexible subframe resource requirement information of each cell, the subframe configuration information of each cell includes a configuration of each of N flexible subframes in each cell, the configuration of each flexible subframe includes that the flexible subframe is configured as an uplink subframe or a downlink subframe, the flexible subframe resource requirement information of each cell includes at least one of the following: a quantity of flexible subframes that are configured as uplink subframes and that are required by each cell, or a quantity of flexible subframes that are configured as downlink subframes and that are required by each cell, and N is a positive integer. The processor 1001 is configured to determine a flexible subframe resource configuration of each of the multiple cells according to the subframe information of each of the multiple cells, where the flexible subframe resource configuration of each cell includes that each cell uses one or more of the N flexible subframes to perform data transmission.

Based on the foregoing technical solution, in this embodiment of the present disclosure, the flexible subframe resource requirement of each of multiple neighboring cells is obtained, and the flexible subframe resource configurations of the cells are coordinated in a distributed manner according to the subframe configuration and the flexible subframe resource requirement of each cell, so that cross-subframe interference that may exist between flexible subframes can be reduced.

It should be understood that, in this embodiment of the present disclosure, the processor 1001 may be a central processing unit (CPU), or the processor 1001 may be another general purpose processor, a digital signal processor (DSP), an application-specific integrated circuit (ASIC), a field programmable gate array (FPGA) or another programmable logic device, discrete gate or transistor logic device, discrete hardware component, or the like. The general purpose processor may be a microprocessor or this processor may be any normal processor, or the like.

The memory 1002 may include a read-only memory and a random access memory, and provide an instruction and data to the processor 1001. A part of the memory 1002 may further include a nonvolatile random access memory. For example, the memory 1002 may further store information about a device type.

In addition to a data bus, the bus system 1003 may include a power bus, a control bus, a status signal bus, and the like. However, for clarity of description, various buses are marked as the bus system 1003 in the figure.

In an implementation process, the steps in the foregoing method may be completed by using an integrated logic circuit of hardware in the processor 1001 or an instruction in a form of software. The steps of the method disclosed with reference to the embodiments of the present disclosure may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 1002. The processor 1001 reads information in the memory 1002, and completes the steps of the foregoing method in combination with hardware of the processor 1001. To avoid repetition, details are not described herein again.

Optionally, in an embodiment of the present disclosure, the processor 1001 is specifically configured to: determine a first-type priority of each of the N flexible subframes according to the subframe information of each of the multiple cells, where a larger quantity of cells in which an $i^{th}$ flexible subframe is configured as a first-type flexible subframe in the multiple cells indicates a higher first-type priority of the $i^{th}$ flexible subframe, the first-type flexible subframe is a flexible subframe that is configured as an uplink subframe or a flexible subframe that is configured as a downlink subframe, and $0 \leq i \leq N$; determine a second-type priority of each of the N flexible subframes according to the subframe information of each of the multiple cells, where a larger quantity of cells in which a $j^{th}$ flexible subframe is configured as a second-type flexible subframe in the multiple cells indicates a higher second-type priority of the $j^{th}$ flexible subframe, the second-type flexible subframe and the first-type flexible subframe are configured differently, and $0 \leq j \leq N$; and determine, according to the first-type priority of each of the N flexible subframes and the second-type priority of each of the N flexible subframes, that each cell uses one or more of the N flexible subframes to perform data transmission.

Optionally, in an embodiment of the present disclosure, the subframe information of each cell includes an idle subframe indication, the idle subframe indication is used to indicate that a corresponding cell sets at least one of the first-type flexible subframe or the second-type flexible subframe in the N flexible subframes to an idle subframe, and the processor 1001 is specifically configured to determine that the prioritization is not performed on the idle subframe.

Optionally, in an embodiment of the present disclosure, the multiple cells include a first cell, a first-type flexible subframe resource requirement of the first cell is 0, and the processor 1001 is specifically configured to determine that the prioritization is not performed on a first-type flexible subframe of the first cell.

Optionally, in an embodiment of the present disclosure, the multiple cells include a second cell and a third cell, and the processor 1001 is specifically configured to: determine, from the N flexible subframes, M first-type flexible subframes required by the second cell, where a flexible subframe resource requirement of the second cell includes that the second cell requires M first-type flexible subframes, and M is a positive integer; and determine, from N−M flexible subframes other than the M flexible subframes according to the M first-type flexible subframes required by the second cell, L second-type flexible subframes required by the third cell, where a flexible subframe resource requirement of the third cell includes that the third cell requires L second-type flexible subframes, and L is a positive integer.

Optionally, in an embodiment of the present disclosure, the processor 1001 is specifically configured to determine, according to the flexible subframe resource requirement information of each of the multiple cells, that the second cell is a cell that requires a largest quantity of first-type flexible subframes.

Optionally, in an embodiment of the present disclosure, the processor 1001 is specifically configured to sequentially determine, from the N flexible subframes according to the first-type priority of each of the N flexible subframes, the M first-type flexible subframes as first-type flexible subframes of the second cell.

Optionally, in an embodiment of the present disclosure, the processor 1001 is specifically configured to sequentially determine, from the N flexible subframes according to the second-type priority of each of the N flexible subframes and the flexible subframe resource requirement of the second cell, P second-type flexible subframes as second-type flexible subframes of the second cell, where the flexible subframe resource requirement information of the second cell includes that the second cell requires P second-type flexible subframes, and P is a positive integer.

Optionally, in an embodiment of the present disclosure, the processor 1001 is specifically configured to determine, according to the flexible subframe resource requirement information of each of the multiple cells, that the third cell is not the cell that requires the largest quantity of first-type flexible subframes.

Optionally, in an embodiment of the present disclosure, the processor 1001 is specifically configured to sequentially determine the L second-type flexible subframes of the third cell from the remaining N−M flexible subframes other than the M first-type flexible subframes according to the second-type priority of each of the N flexible subframes, the flexible subframe resource requirement of the third cell, and the M first-type flexible subframes required by the second cell.

Optionally, in an embodiment of the present disclosure, the processor 1001 is specifically configured to sequentially determine, from the N flexible subframes according to the first-type priority of each of the N flexible subframes and the flexible subframe resource requirement of the third cell, Q first-type flexible subframes as first-type flexible subframes of the third cell, where the flexible subframe resource requirement information of the third cell includes that the third cell requires Q first-type flexible subframes, and Q is a positive integer.

Optionally, in an embodiment of the present disclosure, the transmitter 1005 is specifically configured to send the flexible subframe resource configuration of each cell to each of the multiple cells, where the flexible subframe resource configuration of each cell includes a first-type flexible subframe used by each cell for data transmission and a second-type flexible subframe used by each cell for data transmission.

Based on the foregoing technical solution, in this embodiment of the present disclosure, the flexible subframe resource requirement of each of multiple neighboring cells is obtained, and the flexible subframe resource configurations of the cells are coordinated in a distributed manner according to the subframe configuration and the flexible subframe resource requirement of each cell, so that cross-subframe interference that may exist between flexible subframes can be reduced.

Figure 11:
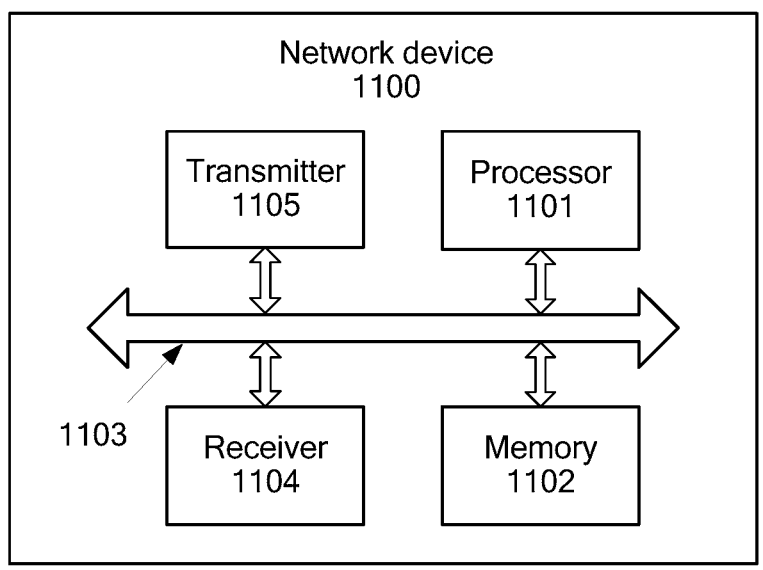
FIG. 11 is a schematic apparatus diagram of a network device according to another embodiment of the present disclosure.

FIG. 11 is a schematic apparatus diagram of a network device according to another embodiment of the present disclosure. The network device 1100 may be a base station. The network device 1100 includes a processor 1101, a memory 1102, a bus system 1103, a receiver 1104, and a transmitter 1105. The processor 1101, the memory 1102, and the receiver 1104 are connected by using the bus system 1103. The memory 1102 is configured to store an instruction, and the processor 1101 is configured to execute the instruction stored in the memory 1102, so as to control the receiver 1104 to receive information. The receiver 1104 is configured to obtain subframe information of each of multiple cells, where the subframe information of each of the multiple cells includes subframe configuration information and flexible subframe resource requirement information of each cell, the subframe configuration information of each cell includes a configuration of each of N flexible subframes in each cell, the configuration of each flexible subframe includes that the flexible subframe is configured as an uplink subframe or a downlink subframe, the flexible subframe resource requirement information of each cell includes at least one of the following: a quantity of flexible subframes that are configured as uplink subframes and that are required by each cell, or a quantity of flexible subframes that are configured as downlink subframes and that are required by each cell, and N is a positive integer. The processor 1101 is configured to determine a flexible subframe resource configuration of each of the multiple cells according to the subframe information of each of the multiple cells, where the flexible subframe resource configuration of each cell includes that each cell uses one or more of the N flexible subframes to perform data transmission.

Based on the foregoing technical solution, in this embodiment of the present disclosure, the flexible subframe resource requirement of each of multiple neighboring cells is obtained, and flexible subframe resource configurations of the cells are coordinated in a distributed manner according to the subframe configuration and the flexible subframe resource requirement of each cell, so that cross-subframe interference that may exist between flexible subframes can be reduced.

It should be understood that, in this embodiment of the present disclosure, the processor 1101 may be a central processing unit (CPU), or the processor 1101 may be another general purpose processor, a digital signal processor (DSP), an application-specific integrated circuit (ASIC), a field programmable gate array (FPGA) or another programmable logic device, discrete gate or transistor logic device, discrete hardware component, or the like. The general purpose processor may be a microprocessor or this processor may be any normal processor, or the like.

The memory 1102 may include a read-only memory and a random access memory, and provide an instruction and data to the processor 1101. A part of the memory 1102 may further include a nonvolatile random access memory. For example, the memory 1102 may further store information about a device type.

In addition to a data bus, the bus system 1103 may include a power bus, a control bus, a status signal bus, and the like. However, for clarity of description, various buses are marked as the bus system 1103 in the figure.

In an implementation process, the steps in the foregoing method may be completed by using an integrated logic circuit of hardware in the processor 1101 or an instruction in a form of software. The steps of the method disclosed with reference to the embodiments of the present disclosure may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 1102. The processor 1101 reads information in the memory 1102, and completes the steps of the foregoing method in combination with hardware of the processor 1101. To avoid repetition, details are not described herein again.

Optionally, in an embodiment of the present disclosure, the processor 1101 is specifically configured to: determine a first-type priority of each of the N flexible subframes according to the subframe information of each of the multiple cells, where a larger quantity of cells in which an $i^{th}$ flexible subframe is configured as a first-type flexible subframe in the multiple cells indicates a higher first-type priority of the $i^{th}$ flexible subframe, the first-type flexible subframe is a flexible subframe that is configured as an uplink subframe or a flexible subframe that is configured as a downlink subframe, and $0 \le i \le N$; determine a second-type priority of each of the N flexible subframes according to the subframe information of each of the multiple cells, where a larger quantity of cells in which a $j^{th}$ flexible subframe is configured as a second-type flexible subframe in the multiple cells indicates a higher second-type priority of the $j^{th}$ flexible subframe, the second-type flexible subframe and the first-type flexible subframe are configured differently, and $0 \le j \le N$; and determine, according to the first-type priority of each of the N flexible subframes and the second-type priority of each of the N flexible subframes, that each cell uses one or more of the N flexible subframes to perform data transmission.

Optionally, in an embodiment of the present disclosure, the subframe information of each cell includes an idle subframe indication, the idle subframe indication is used to indicate that a corresponding cell sets at least one of the first-type flexible subframe or the second-type flexible subframe in the N flexible subframes to an idle subframe, and the processor 1101 is specifically configured to determine that the prioritization is not performed on the idle subframe.

Optionally, in an embodiment of the present disclosure, the multiple cells include a first cell, a first-type flexible subframe resource requirement of the first cell is 0, and the processor 1101 is specifically configured to determine that the prioritization is not performed on a first-type flexible subframe of the first cell.

Optionally, in an embodiment of the present disclosure, the multiple cells include a second cell and a third cell, and the processor 1101 is specifically configured to: determine, from the N flexible subframes, M first-type flexible subframes required by the second cell, where a flexible subframe resource requirement of the second cell includes that the second cell requires M first-type flexible subframes, and M is a positive integer; and determine, from N−M flexible subframes other than the M flexible subframes according to the M first-type flexible subframes required by the second cell, L second-type flexible subframes required by the third cell, where a flexible subframe resource requirement of the third cell includes that the third cell requires L second-type flexible subframes, and L is a positive integer.

Optionally, in an embodiment of the present disclosure, the processor 1101 is specifically configured to determine, according to the flexible subframe resource requirement information of each of the multiple cells, that the second cell is a cell that requires a largest quantity of first-type flexible subframes.

Optionally, in an embodiment of the present disclosure, the processor 1101 is specifically configured to sequentially determine the M first-type flexible subframes as first-type flexible subframes of the second cell from the N flexible subframes according to the first-type priority of each of the N flexible subframes.

Optionally, in an embodiment of the present disclosure, the processor 1101 is specifically configured to sequentially determine, from the N flexible subframes according to the second-type priority of each of the N flexible subframes and the flexible subframe resource requirement of the second cell, P second-type flexible subframes as second-type flexible subframes of the second cell, where the flexible subframe resource requirement information of the second cell includes that the second cell requires P second-type flexible subframes, and P is a positive integer.

Optionally, in an embodiment of the present disclosure, the transmitter 1105 is configured to send a first-type flexible subframe resource configuration of the second cell to each cell in the at least one neighboring cell, where the first-type flexible subframe resource configuration of the second cell includes that the second cell uses the M first-type flexible subframes to perform data transmission.

Optionally, in an embodiment of the present disclosure, the processor 1101 is specifically configured to determine, according to the flexible subframe resource requirement information of each of the multiple cells, that the third cell is not the cell that requires the largest quantity of first-type flexible subframes.

Optionally, in an embodiment of the present disclosure, the processor 1101 is specifically configured to sequentially determine the L second-type flexible subframes of the third cell from the remaining N−M flexible subframes other than the M first-type flexible subframes according to the second-type priority of each of the N flexible subframes, the flexible subframe resource requirement of the third cell, and the M first-type flexible subframes required by the second cell.

Optionally, in an embodiment of the present disclosure, the processor 1101 is specifically configured to sequentially determine, from the N flexible subframes according to the first-type priority of each of the N flexible subframes and the flexible subframe resource requirement of the third cell, Q first-type flexible subframes as first-type flexible subframes of the third cell, where the flexible subframe resource requirement information of the third cell includes that the third cell requires Q first-type flexible subframes, and Q is a positive integer.

Based on the foregoing technical solution, in this embodiment of the present disclosure, the flexible subframe resource requirement of each of multiple neighboring cells is obtained, and the flexible subframe resource configurations of the cells are coordinated in a distributed manner according to the subframe configuration and the flexible subframe resource requirement of each cell, so that cross-subframe interference that may exist between flexible subframes can be reduced.

It should be understood that FIG. 10 and FIG. 11 show merely a simple design of a network device. In actual application, the network device may further include any quantity of other hardware, and all network devices that can implement the present disclosure fall within the protection scope of the present disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a portable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A resource configuration method in a time division duplex mode, the method comprising:
obtaining, by a network device, subframe information of each of multiple cells, wherein the subframe information of each of the multiple cells comprises subframe configuration information and flexible subframe resource requirement information of each cell, the subframe configuration information of each cell comprises a configuration for each flexible subframe of N flexible subframes in each cell as an uplink subframe or a downlink subframe, the flexible subframe resource requirement information of each cell comprises at least one of the following: a quantity of flexible subframes that are configured as uplink subframes and that are required by each cell, or a quantity of flexible subframes that are configured as downlink subframes and that are required by each cell, and N is a positive integer;
determining, by the network device, a flexible subframe resource configuration of each of the multiple cells according to the subframe information of each of the multiple cells, comprising:
determining a first-type priority of each of the N flexible subframes according to the subframe information of each of the multiple cells, wherein a first quantity of cells in which an $i^{th}$ flexible subframe is configured as a first-type flexible subframe in the multiple cells indicates a higher first-type priority of the $i^{th}$ flexible subframe than a second quantity of cells in which an $i^{th}$ flexible subframe is configured as a first-type flexible subframe in the multiple cells when the first quantity is larger than the second quantity, the first-type flexible subframe is a flexible subframe that is configured as an uplink subframe or a flexible subframe that is configured as a downlink subframe, $1 \leq i \leq N$, and i is an integer; and wherein the flexible subframe resource configuration of each cell comprises that each cell uses one or more of the N flexible subframes to perform data transmission.

2. The method according to claim 1, wherein determining a flexible subframe resource configuration of each of the multiple cells according to the subframe information of each of the multiple cells comprises:

determining a second-type priority of each of the N flexible subframes according to the subframe information of each of the multiple cells, wherein a first quantity of cells in which a $j^{th}$ flexible subframe is configured as a second-type flexible subframe in the multiple cells indicates a higher second-type priority of the $j^{th}$ flexible subframe than a second quantity of cells in which a $j^{th}$ flexible subframe is configured as a first-type flexible subframe in the multiple cells when the first quantity is larger than the second quantity, the second-type flexible subframe and the first-type flexible subframe are configured differently, $1 \leq j \leq N$, and j is an integer; and determining, according to the first-type priority of each of the N flexible subframes and the second-type priority of each of the N flexible subframes, that each cell uses one or more of the N flexible subframes to perform data transmission.

3. The method according to claim 2, wherein:
the subframe information of each cell comprises an idle subframe indication for indicating that a corresponding cell sets at least one of the first-type flexible subframe or the second-type flexible subframe of the N flexible subframes to an idle subframe; and
determining a flexible subframe resource configuration of each of the multiple cells according to the subframe information of each of the multiple cells comprises:
determining that the prioritization is not performed on the idle subframe.

4. The method according to claim 2, wherein:
the multiple cells comprise a first cell;
a first-type flexible subframe resource requirement of the first cell is 0; and
determining a flexible subframe resource configuration of each of the multiple cells according to the subframe information of each of the multiple cells comprises:
determining that the prioritization is not performed on a first-type flexible subframe of the first cell.

5. The method according to claim 2, wherein:
the multiple cells comprise a second cell and a third cell; and
determining, according to the first-type priority of each of the N flexible subframes and the second-type priority of each of the N flexible subframes, that each cell uses one or more of the N flexible subframes to perform data transmission comprises:
determining, from the N flexible subframes, M first-type flexible subframes required by the second cell, wherein a flexible subframe resource requirement of the second cell comprises that the second cell requires M first-type flexible subframes, and M is a positive integer, and
determining, from N–M flexible subframes other than the M flexible subframes according to the M first-type flexible subframes required by the second cell, L second-type flexible subframes required by the third cell, wherein a flexible subframe resource requirement of the third cell comprises that the third cell requires L second-type flexible subframes, and L is a positive integer.

6. The method according to claim 5, wherein before determining, from the N flexible subframes, M first-type flexible subframes required by the second cell, the method further comprises:
determining, according to the flexible subframe resource requirement information of each of the multiple cells, that the second cell is a cell that requires a largest quantity of first-type flexible subframes.

7. The method according to claim 5, wherein determining, from the N flexible subframes, M first-type flexible subframes required by the second cell further comprises:
sequentially determining, from the N flexible subframes according to the first-type priority of each of the N flexible subframes, the M first-type flexible subframes as first-type flexible subframes of the second cell.

8. The method according to claim 5, wherein determining, according to the first-type priority of each of the N flexible subframes and the second-type priority of each of the N flexible subframes, that each cell uses one or more of the N flexible subframes to perform data transmission comprises:
sequentially determining, from the N flexible subframes according to the second-type priority of each of the N flexible subframes and the flexible subframe resource requirement of the second cell, P second-type flexible subframes as second-type flexible subframes of the second cell, wherein the flexible subframe resource requirement information of the second cell comprises that the second cell requires P second-type flexible subframes, and P is a positive integer.

9. The method according to claim 5, wherein:
the network device is a base station of the second cell; and
the method further comprises:
sending a first-type flexible subframe resource configuration of the second cell to each cell of at least one neighboring cell, wherein the first-type flexible subframe resource configuration of the second cell comprises that the second cell uses the M first-type flexible subframes to perform data transmission.

10. The method according to claim 5, wherein before determining, from N–M flexible subframes other than the M flexible subframes according to the M first-type flexible subframes required by the second cell, L second-type flexible subframes required by the third cell, the method further comprises:
determining, according to the flexible subframe resource requirement information of each of the multiple cells, that the third cell is not the cell that requires the largest quantity of first-type flexible subframes.

11. The method according to claim 5, wherein determining, from N-M flexible subframes other than the M flexible subframes according to the M first-type flexible subframes required by the second cell, L second-type flexible subframes required by the third cell further comprises:
sequentially determining the L second-type subframes of the third cell from the remaining N-M flexible subframes other than the M first-type flexible subframes according to the second-type priority of each of the N flexible subframes, the flexible subframe resource requirement of the third cell, and the M first-type flexible subframes required by the second cell.

12. The method according to claim 5, wherein determining, according to the first-type priority of each of the N flexible subframes and the second-type priority of each of the N flexible subframes, that each cell uses one or more of the N flexible subframes to perform data transmission comprises:
sequentially determining, from the N flexible subframes according to the first-type priority of each of the N flexible subframes and the flexible subframe resource requirement of the third cell, Q first-type flexible subframes as first-type flexible subframes of the third cell, wherein the flexible subframe resource requirement information of the third cell comprises that the third cell requires Q first-type flexible subframes, and Q is a positive integer.

13. The method according to claim 2, wherein:
the network device is a centralized controller; and
the method further comprises:
sending the flexible subframe resource configuration of each cell to each of the multiple cells, wherein the flexible subframe resource configuration of each cell comprises a first-type flexible subframe used by each cell for data transmission and a second-type flexible subframe used by each cell for data transmission.

14. A resource configuration network device, comprising:
a receiver configured to obtain subframe information of each of multiple cells, wherein the subframe information of each of the multiple cells comprises subframe configuration information and flexible subframe resource requirement information of each cell, the subframe configuration information of each cell comprises a configuration of each of N flexible subframes in each cell as an uplink subframe or a downlink subframe, the flexible subframe resource requirement information of each cell comprises at least one of the following: a quantity of flexible subframes that are configured as uplink subframes and that are required by each cell, or a quantity of flexible subframes that are configured as downlink subframes and that are required by each cell, and N is a positive integer; and
a processor configured to:
determine a flexible subframe resource configuration of each of the multiple cells according to the subframe information of each of the multiple cells,
determine a first-type priority of each of the N flexible subframes according to the subframe information of each of the multiple cells, wherein a first quantity of cells in which an $i^{th}$ flexible subframe is configured as a first-type flexible subframe in the multiple cells indicates a higher first-type priority of the $i^{th}$ flexible subframe than a second quantity of cells in which an $i^{th}$ flexible subframe is configured as a first-type flexible subframe in the multiple cells when the first quantity is larger than the second quantity, the first-type flexible subframe is a flexible subframe that is configured as an uplink subframe or a flexible subframe that is configured as a downlink subframe, $1 \leq i \leq N$, and i is an integer; and
wherein the flexible subframe resource configuration of each cell comprises that each cell uses one or more of the N flexible subframes to perform data transmission.

15. The network device according to claim 14, wherein the processor is configured to:
determine a second-type priority of each of the N flexible subframes according to the subframe information of each of the multiple cells, wherein a first quantity of cells in which a $j^{th}$ flexible subframe is configured as a second-type flexible subframe in the multiple cells indicates a higher second-type priority of the $j^{th}$ flexible subframe than a second quantity of cells in which a $j^{th}$ flexible subframe is configured as a first-type flexible subframe in the multiple cells when the first quantity is larger than the second quantity, the second-type flexible subframe and the first-type flexible subframe are configured differently, $1 \leq j \leq N$, and j is an integer; and
determine, according to the first-type priority of each of the N flexible subframes and the second-type priority of each of the N flexible subframes, that each cell uses one or more of the N flexible subframes to perform data transmission.

16. The network device according to claim 15, wherein:
the subframe information of each cell comprises an idle subframe indication for indicating that a corresponding cell sets at least one of the first-type flexible subframe or the second-type flexible subframe of the N flexible subframes to an idle subframe; and
the processor is further configured to:
determine that the prioritization is not performed on the idle subframe.

17. The network device according to claim 15, wherein:
the multiple cells comprise a first cell;
a first-type flexible subframe resource requirement of the first cell is 0; and
the processor is further configured to:
determine that the prioritization is not performed on a first-type flexible subframe of the first cell.

18. The network device according to claim 15, wherein:
the multiple cells comprise a second cell and a third cell; and
the processor is further configured to:
determine, from the N flexible subframes, M first-type flexible subframes required by the second cell, wherein a flexible subframe resource requirement of the second cell comprises that the second cell requires M first-type flexible subframes, and M is a positive integer, and
determine, from N-M flexible subframes other than the M flexible subframes according to the M first-type flexible subframes required by the second cell, L second-type flexible subframes required by the third cell, wherein a flexible subframe resource requirement of the third cell comprises that the third cell requires L second-type flexible subframes, and L is a positive integer.

19. The network device according to claim 18, wherein the processor is further configured to:
determine, according to the flexible subframe resource requirement information of each of the multiple cells, that the second cell is a cell that requires a largest quantity of first-type flexible subframes.

20. The network device according to claim 15, wherein:
the network device is a centralized controller; and
the network device further comprises:
a transmitter configured to send the flexible subframe resource configuration of each cell to each of the multiple cells, wherein the flexible subframe resource configuration of each cell comprises a first-type flexible subframe used by each cell for data transmission and a second-type flexible subframe used by each cell for data transmission.

* * * * *